(12) United States Patent
Sayeed

(10) Patent No.: US 9,763,216 B2
(45) Date of Patent: Sep. 12, 2017

(54) RADIATOR LOCALIZATION

(71) Applicant: Wisconsin Alumni Research Foundation, Madison, WI (US)

(72) Inventor: Akbar Muhammad Sayeed, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 511 days.

(21) Appl. No.: 14/455,095

(22) Filed: Aug. 8, 2014

(65) Prior Publication Data

US 2016/0365904 A1 Dec. 15, 2016

(51) Int. Cl.
*H04B 7/02* (2017.01)
*H04W 64/00* (2009.01)
*G01S 5/02* (2010.01)

(52) U.S. Cl.
CPC ........... *H04W 64/00* (2013.01); *G01S 5/0252* (2013.01)

(58) Field of Classification Search
CPC ....... H04W 64/00; H04W 4/02; H04W 4/023; H04W 4/20; H04W 4/005; H04W 52/225; H04W 64/003; H04W 68/04; H04W 88/00; H04B 7/0617; H04B 7/0452; H04B 7/04; H04L 67/22; H04L 5/0035; H04L 2025/03426
USPC ........... 375/267, 349, 346; 455/456.1, 456.5, 455/456.3, 457, 422.1; 342/147, 450
See application file for complete search history.

(56) References Cited

U.S. PATENT DOCUMENTS

| | | | |
|---|---|---|---|
| 4,381,509 | A | 4/1983 | Rotman et al. |
| 5,204,981 | A | 4/1993 | Karasawa et al. |
| 6,292,138 | B1 | 9/2001 | Choi |
| 6,845,240 | B2 | 1/2005 | Carlson et al. |
| 6,864,826 | B1 | 3/2005 | Stove |
| 6,873,852 | B2 * | 3/2005 | Koorapaty ............ H04W 64/00 342/450 |

(Continued)

FOREIGN PATENT DOCUMENTS

| | | |
|---|---|---|
| EP | 2182582 | 5/2010 |
| EP | 2221919 | 8/2010 |

(Continued)

OTHER PUBLICATIONS

Lee et al., Multi-Beam Phased Array Antennas, http://www.archive.org/details/nasa_techdoc_20030020930, Jan. 1, 2002.

(Continued)

*Primary Examiner* — Rahel Guarino
(74) *Attorney, Agent, or Firm* — Bell & Manning, LLC

(57) ABSTRACT

A method of locating a radiator is provided. A channel measurement vector is defined that includes a signal value measured at each of a plurality of antennas in response to a signal transmitted from a radiator. (a) A cell covariance matrix of a first cell from a plurality of cells defined for a region in which the radiator is located is selected. (b) A likelihood value that the radiator is located in the first cell is calculated using the selected cell covariance matrix and the defined channel measurement vector. (a) and (b) are repeated with each cell of the plurality of cells as the first cell. A cell location of the radiator is selected based on the calculated likelihood value for each cell of the plurality of cells.

20 Claims, 14 Drawing Sheets

(56) References Cited

U.S. PATENT DOCUMENTS

| | | | |
|---|---|---|---|
| 7,283,499 | B2 | 10/2007 | Priotti et al. |
| 7,289,466 | B2 | 10/2007 | Kore et al. |
| 7,411,517 | B2 | 8/2008 | Flanagan |
| 7,433,648 | B2 | 10/2008 | Bridgelall |
| 7,603,129 | B2 | 10/2009 | Gonia et al. |
| 7,881,671 | B2 | 2/2011 | Sayeed |
| 7,898,480 | B2 | 3/2011 | Ebling et al. |
| 8,000,730 | B2 | 8/2011 | Sayeed |
| 8,811,511 | B2 | 8/2014 | Sayeed et al. |
| 2003/0083016 | A1 | 5/2003 | Evans et al. |
| 2004/0067775 | A1 | 4/2004 | Dalal et al. |
| 2005/0265470 | A1 | 12/2005 | Kishigami et al. |
| 2006/0028375 | A1 | 2/2006 | Honda et al. |
| 2006/0028386 | A1 | 2/2006 | Ebling et al. |
| 2007/0224949 | A1 | 9/2007 | Morton et al. |
| 2007/0258392 | A1 | 11/2007 | Larsson et al. |
| 2008/0055175 | A1 | 3/2008 | Rebeiz et al. |
| 2010/0103049 | A1 | 4/2010 | Tabakovic |
| 2010/0194663 | A1 | 8/2010 | Rothwell et al. |
| 2010/0207833 | A1 | 8/2010 | Toso et al. |
| 2011/0034179 | A1* | 2/2011 | David ............... G01S 5/0236 455/456.1 |
| 2012/0033618 | A1 | 2/2012 | Wallace et al. |
| 2013/0322495 | A1 | 12/2013 | Behdad et al. |

FOREIGN PATENT DOCUMENTS

| | | |
|---|---|---|
| WO | WO 2007/127955 | 11/2007 |
| WO | WO 2008/061107 | 5/2008 |

OTHER PUBLICATIONS

Rao et al., Measurement Results of an Affordable Hybrid Phased Array Using a Radant Lens, Naval Research Laboratory Memo Report No. 5320--00/8439, May 15, 2000, Washington, D.C.

Hong et al., Spatial Processing With Lens Antenna Arrays for Direction-of-Arrival Estimation, Proceedings from "International Union of Radio Science" 27th General Assembly, Maastricht, the Netherlands, http://www.ursi.org/Proceedings/ProcGA02/ursiga02.pdf, Aug. 17, 2002.

Romisch et al., Multi-Beam Discrete Lens Arrays with Amplitude-Controlled Steering, 2003 IEEE MTT-S Int. Micmwave Symp. Dig., Philadelphia, PA, Jun. 2003, pp. 1669-1672.

Romisch et al., Multibeam Planar Discrete Millimeter—Wave Lens for Fixed-Formation Satellites, 2002 URSI General Assembly Digest, Maastricht, The Netherlands, Aug. 2002.

Schoenberg et al., Two-level power combining using a lens amplifier, IEEE Trans. Microwave Theory Techn., vol. 42, No. 12, Dec. 1994, pp. 2480-2485.

Shiroma et al., A quasi-optical receiver with angle diversity, Proceedings of the IEEE International Microwave Symposium, San Francisco, 1996, pp. 1131-1134.

McGrath et al., Planar three-dimensional constrained lenses, IEEE Trans. Antennas Propagat., vol. 34, No. 1, Jan. 1986, pp. 46-50.

Hollung et al., A bi-directional quasi-optical lens amplifier, IEEE Trans. Microwave Theory Techn., vol. 45, No. 12, Dec. 1997, pp. 2352-2357.

Popovic et al., Quasi-optical transmit/receive front ends, IEEE Trans. Microwave Theory Techn., vol. 48, No. 11, Nov. 1998, pp. 1964-1975.

Abbaspour-Tamijani et al., A planar filter-lens array for millimeter-wave applications, Proceedings of the IEEE International Antennas and Propagation Society International Symposium, vol. 1, Monterey, CA , Jun. 20, 2004, pp. 675-678.

Pozar et al., Flat lens antenna concept using aperture coupled microstrip patches, Electronics Letters, vol. 32, No. 23, Nov. 7, 1996, pp. 2109-2111.

Saleau et al., Quasi axis-symmetric integrated lens antennas: design rules and experimental/manufacturing trade-offs at millimeter-wave frequencies, Microwave and Optical Technology Letters, vol. 48, No. 1, Jan. 2006, pp. 20-29.

Al-Joumayly et al., Slide presentation of "Design of conformal, high-resolution microwave lenses using sub wavelength periodic structures", 2010 IEEE Antennas and Propagation Society/URSI Symposium, Toronto, ON, Jul. 11, 2010.

International Search Report and Written Opinion issued in PCT/US2011/045911, Jan. 19, 2012.

Al-Joumayly et al., Abstract of "Design of conformal, high-resolution microwave lenses using sub wavelength periodic structures", 2010 IEEE Antennas and Propagation Society/URSI Symposium, Toronto, ON , Jul. 11, 2010.

International Search Report and Written Opinion issued in PCT/US2007/066708, Sep. 15, 2008.

Ananthasubramaniam et al., On Localization Performance in Imaging Sensor Nets, Submitted to IEEE Transactions on Signal Processing, Nov. 2005.

Ananthasubramaniam et al., Detection and Localization of Events in Imaging Sensor Nets, Proc. 2005 IEEE International Symposium on Information Theory (ISIT 2005), Adelaide, Australia, Sep. 2005.

Ananthasubramaniam et al., Virtual Radar Approach to Event Localization in Sensor Networks, Proc. 2004 IEEE International Symposium on Information Theory (ISIT 2004), Chicago, IL,, Jun. 27, 2004.

Ananthasubramaniam et al., Virtual Radar Imaging for Sensor Networks, Proc. 3rd International Symposium on Information Processing in Sensor Networks (IPSN'04), Berkeley, California, USA, Apr. 2004.

Bajwa et. al., Matched source-Channel Communication for Field Estimation in Wireless Sensor Networks, IPSN'05, Apr. 2005.

Sayeed, A Virtual Representation for Time- and Frequency-selective Correlated MIMO Channels, ICASSP 2003, vol. 4 pp. 648-651.

Sayeed, Deconstructing Multi-antenna Fading Channels, IEEE Transactions on Signal Processing, vol. 50, No. 10, Oct. 2002, pp. 2563-2579.

Sayeed et al., Capacity of Space-Time Wireless Channels: A Physical Perspective, ITW2004, San Antonio, Texas, Oct. 24, 2004.

Barriac et al., Space-Time Communication for OFDM with Implicit Channel Feedback, University of California, Santa Barbara, Dec. 11, 2003.

Brady et al., Beamspace MIMO for Millimeter-Wave Communications: System Architecture, Modeling, Analysis, and Measurements, IEEE Transactions on Antennas and Propagation, vol. 61, No. 7, Mar. 22, 2013, pp. 1-13.

Sayeed et al., Continuous Aperture Phased MIMO: A New Architecture for Optimum Line-of-Sight Links, 2011 IEEE International Symposium on Antennas and Propagation (APSURSI), Jul. 3, 2011, Spokane, WA.

Papakonstantinou et al., Performance Bounds and Identifiability Conditions for Location Estimation in NLOS Dynamic Environments, 2011 IEEE Statistical Signal Processing Workshop (SSP), Jun. 28, 2011, pp. 189-192.

* cited by examiner

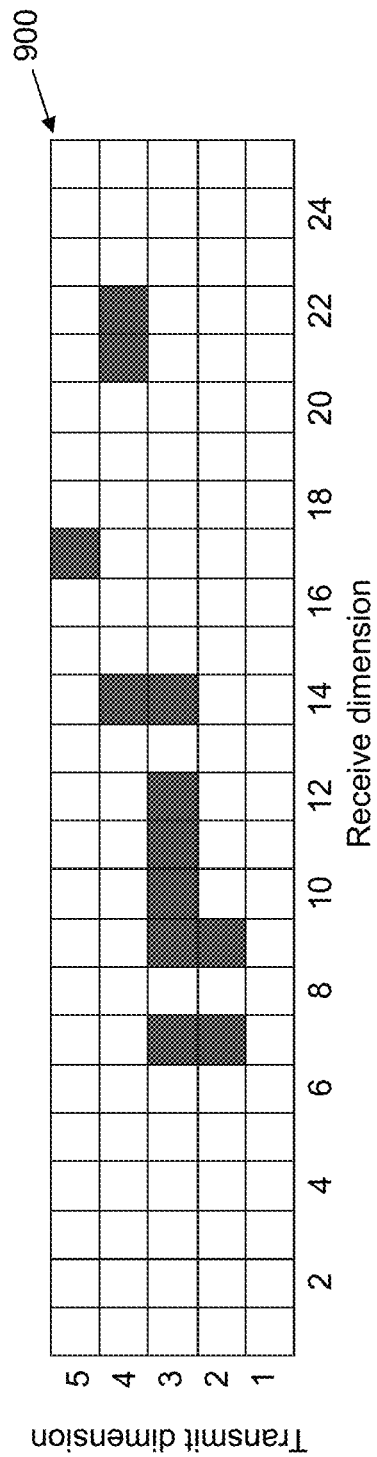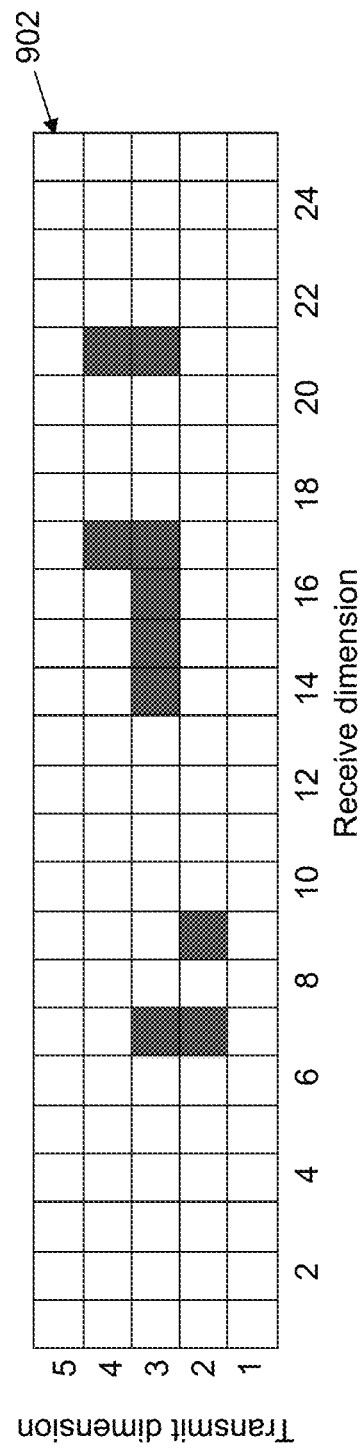

RADIATOR LOCALIZATION

REFERENCE TO GOVERNMENT RIGHTS

This invention was made with government support under 1247583 awarded by the National Science Foundation. The government has certain rights in the invention.

BACKGROUND

The rapid proliferation of wireless devices is leading to exponential growth in data rates. At existing frequencies, small-cell technology is being explored for meeting this challenge by increasing the spatial re-use of the limited spectrum. Higher frequencies above 6 gigahertz (GHz), including millimeter-wave frequencies (30-300 GHz), are also being explored for addressing the spectrum crunch.

Localization based on wireless channel signatures has a wide range of applications. Wireless channel signatures become richer and more informative at higher frequencies and offer new possibilities for localization. Existing techniques typically use information provided by a line-of-sight (LoS) path, including an angle of arrival, a time difference of arrival, or a received signal strength. However, LoS propagation is not always guaranteed in a real world environment.

SUMMARY

In an illustrative embodiment, a method of locating a radiator is provided. A channel measurement vector is defined that includes a signal value measured at each of a plurality of antennas in response to a signal transmitted from a radiator. (a) A cell covariance matrix of a first cell from a plurality of cells defined for a region in which the radiator is located is selected. (b) A likelihood value that the radiator is located in the first cell is calculated using the selected cell covariance matrix and the defined channel measurement vector. (a) and (b) are repeated with each cell of the plurality of cells as the first cell. A cell location of the radiator is selected based on the calculated likelihood value for each cell of the plurality of cells.

In another illustrative embodiment, a computer-readable medium is provided having stored thereon computer-readable instructions that, when executed by a computing device, cause the computing device to perform the method of locating a radiator.

In yet another illustrative embodiment, a computing device is provided. The system includes, but is not limited to, a processor and a computer-readable medium operably coupled to the processor. The computer-readable medium has instructions stored thereon that, when executed by the computing device, cause the computing device to perform the method of locating a radiator.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIGS. 9a, 9b, 9c, and 9d depicts channel sparsity masks in accordance with an illustrative embodiment.

DETAILED DESCRIPTION

Figure 1:
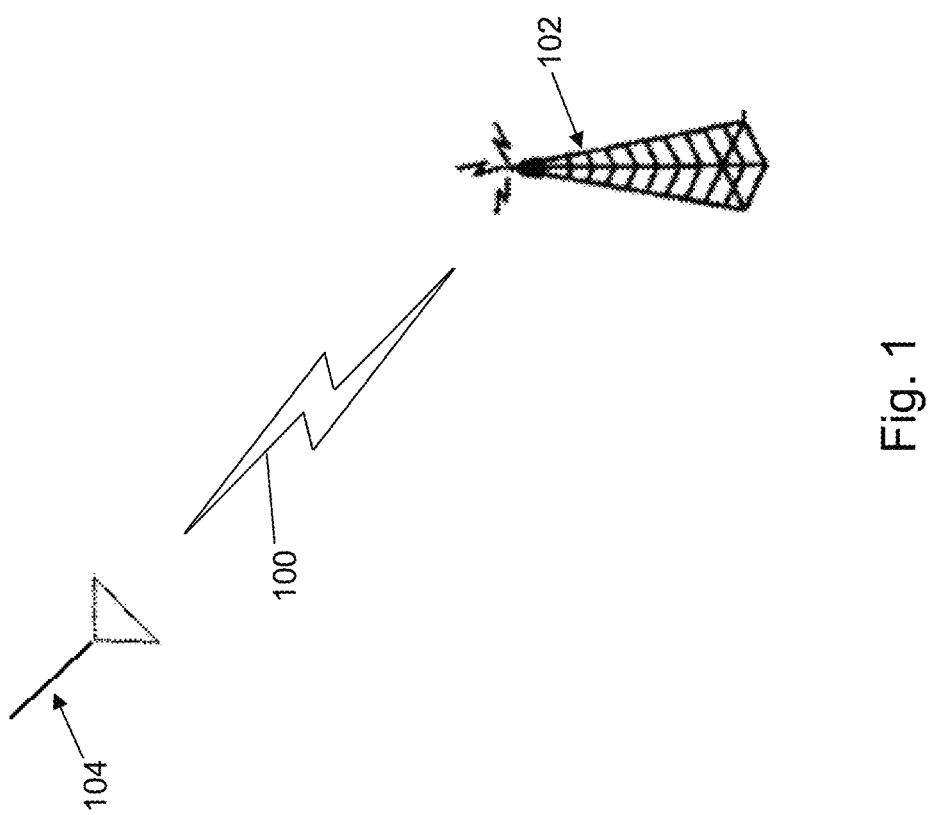
FIG. 1 depicts an ideal communication scenario in accordance with an illustrative embodiment.

Referring to FIG. 1, in an ideal communication scenario, there is a line-of-sight (LoS) path between a transmitter 104 and a receiver 102 that represents clear spatial channel characteristics. For example, a signal 100 transmitted by transmitter 104 is radiated towards receiver 102 on the LoS path. It should be understood that transmitter 104 may include a transceiver that supports both the transmission and the reception of electromagnetic waves. Similarly, receiver 102 may include a transceiver that supports both the transmission and the reception of electromagnetic waves. Use of the terms transmitter and receiver is to describe an example function of each device.

Figure 2:
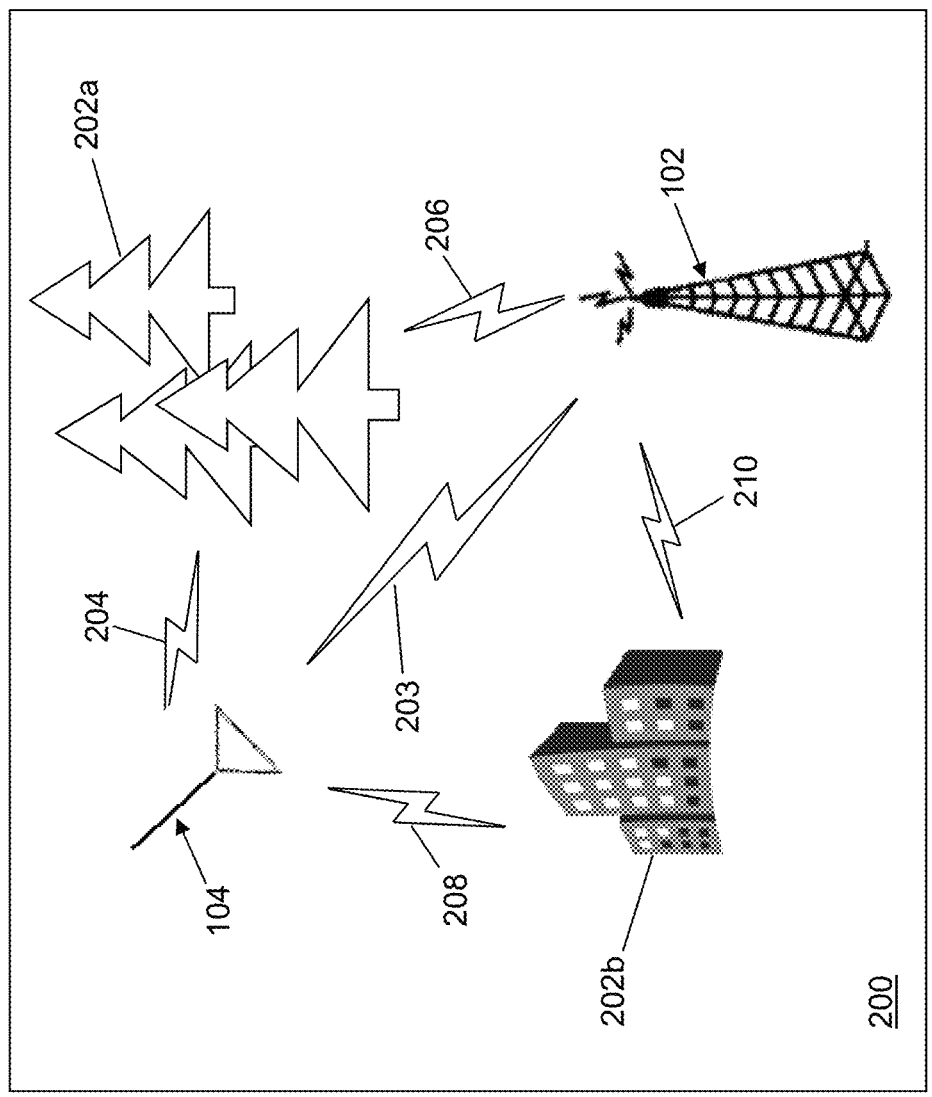
FIG. 2 depicts a transmitter and a receiver in a scattering environment in accordance with an illustrative embodiment.

In urban wireless systems, receiver 102, such as a base station, may be located on a rooftop while transmitter 104, such as a laptop, tablet, smartphone, etc., is located either indoors, in a vehicle, or outdoors at street level distributed from receiver 102. For example, referring to FIG. 2, transmitter 104 and receiver 102 are depicted in a scattering environment 200. Scattering environment 200 may be created based on a first scatterer 202a and a second scatterer 202b. Scattering environment may include any number, distribution, and types of scatterers capable of reflecting electromagnetic waves. Merely for illustration, first scatterer 202a represents vegetation, such as trees, and second scatterer 202b represents manmade structures, such as buildings, roads, bridges, vehicles, etc.

While a first portion 203 of signal 100 may be received by receiver 102 on the LoS path, a second portion 204 of signal 100 may be radiated towards first scatterer 202a, and a third portion 208 of signal 100 may be radiated towards second scatterer 202b. First scatterer 202a may reflect a first portion 206 of second portion 204 of signal 100 towards receiver 102 that arrives at receiver 102 time delayed, attenuated, possibly Doppler shifted (e.g., first scatterer 202a is moving), and at a different angle of arrival than the first portion 203 of signal 100. Second scatterer 202b may reflect a first portion 210 of third portion 208 of signal 100 towards receiver 102 that also arrives at receiver 102 time delayed, attenuated, possibly Doppler shifted (e.g., second scatterer 202b is moving), and at a different angle of arrival than the first portion 203 of signal 100. Doppler shifts may also be caused by relative motion between transmitter 104 and receiver 102 without the scatterers moving.

First portion 206 of second portion 204 of signal 100 and first portion 210 of third portion 208 of signal 100 are multipath signals. Multipath signal propagation results in multiple, spatially distributed, receive paths. A non-LoS (NLoS) multipath propagation channel between receiver 102 and transmitter 104 describes how a signal is received and reflected from various scatterers on its way from transmitter 104 to receiver 102. A signal received at receiver 102 may still have a strong spatial signature in the sense that stronger average signal gains are received from certain spatial directions based on a reflection from one or more of the various scatterers.

Figure 3:
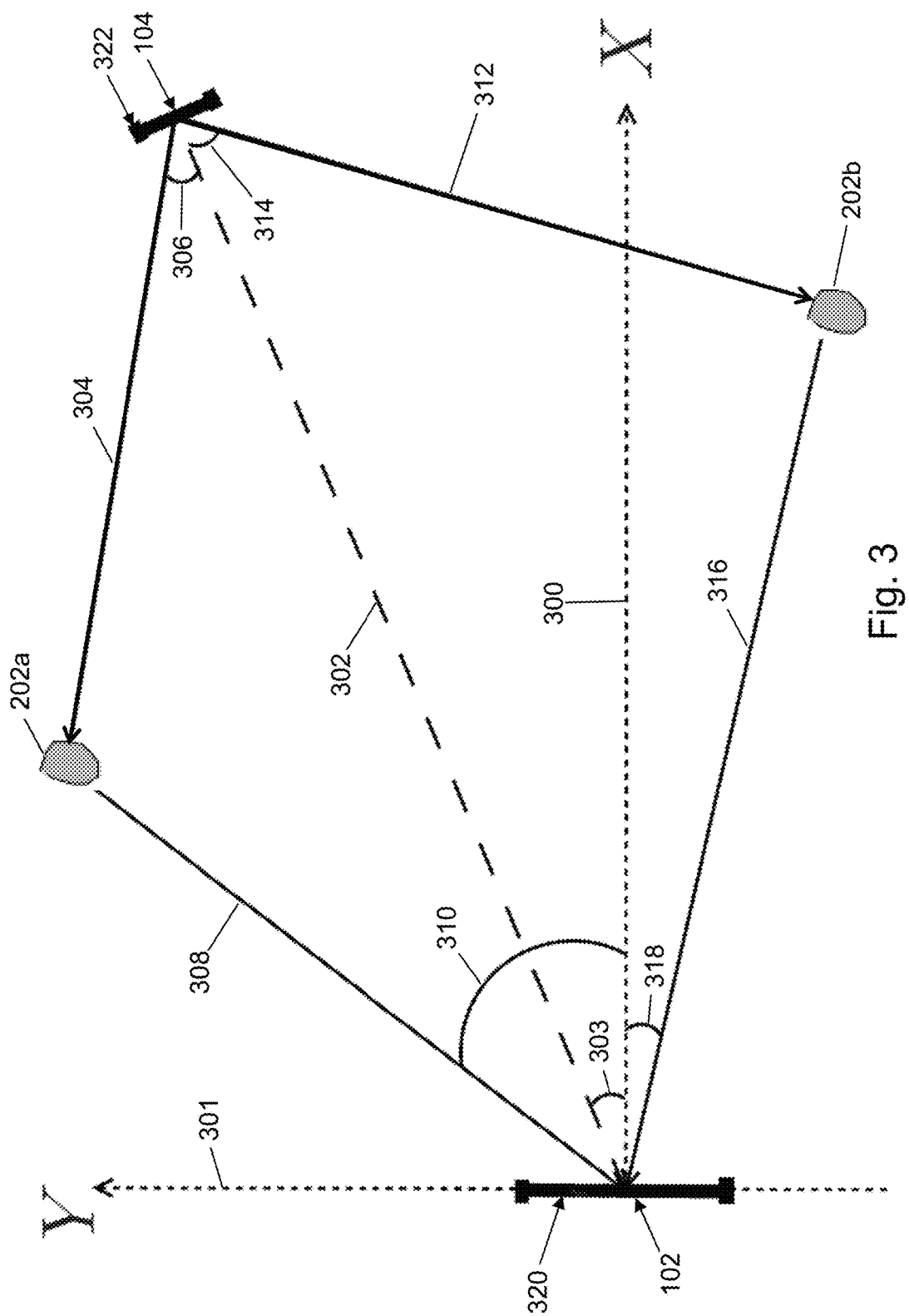
FIG. 3 depicts a geometrical relationship between the transmitter and the receiver in the scattering environment in accordance with an illustrative embodiment.

Referring to FIG. 3, a geometrical relationship between receiver 102 and transmitter 104 in scattering environment 200 is shown in accordance with an illustrative embodiment. A location of receiver 102 is an origin of an X-Y coordinate system. An X-axis 300 is defined as broadside relative to a receiver antenna 320 of receiver 102. A Y-axis 301 is defined as perpendicular to X-axis 300 and in a plane of antenna 320. For illustration, a transmitter antenna 322 of transmitter 104 is assumed to point toward receiver 102 in a LoS direction 302 making LoS direction 302 broadside relative to a transmitter antenna 322 of transmitter 104. First portion 203 of signal 100 may be received by receiver 102 on the LoS path defined by LoS direction 302 at a first angle of arrival (AoA) 303 relative to X-axis 300. The LoS path defined by LoS direction 302 has a LoS range defined by $\sqrt{x_t^2+y_t^2}$, where $(x_t, y_t)$ are the coordinates of transmitter 104 in the X-Y coordinate system.

First scatterer 202a and second scatterer 202b are located between transmitter 104 and receiver 102. Second portion 204 of signal 100 may be radiated towards first scatterer 202a in a first scatterer transmit direction 304 defined at a first angle of departure (AoD) 306 relative to LoS direction 302. First scatterer transmit direction 304 has a first scatterer transmit range defined by $\sqrt{(x_t-x_{s1})^2+(y_t-y_{s1})^2}$, where $(x_{s1}, y_{s1})$ are the coordinates of first scatterer 202a in the X-Y coordinate system. First portion 206 of second portion 204 of signal 100 may be reflected toward receiver antenna 320 of receiver 102 in a first scatterer receive direction 308 defined at a first scatterer AoA 310 relative to X-axis 300. First scatterer receive direction 308 has a first scatterer receive range defined by $\sqrt{x_{s1}^2+y_{s1}^2}$.

Third portion 208 of signal 100 may be radiated towards second scatterer 202b in a second scatterer transmit direction 312 defined at a second angle of departure (AoD) 304 relative to LoS direction 302. Second scatterer transmit direction 312 has a second scatterer transmit range defined by $\sqrt{(x_t-x_{s2})^2+(y_t-y_{s2})^2}$, where $(x_{s2}, y_{s2})$ are the coordinates of second scatterer 202b in the X-Y coordinate system. First portion 210 of third portion 208 of signal 100 may be reflected toward receiver antenna 320 of receiver 102 in a second scatterer receive direction 316 defined at a second scatterer AoA 318 relative to X-axis 300. Second scatterer receive direction 316 has a second scatterer receive range defined by $\sqrt{x_{s2}^2+y_{s2}^2}$.

Figure 4:
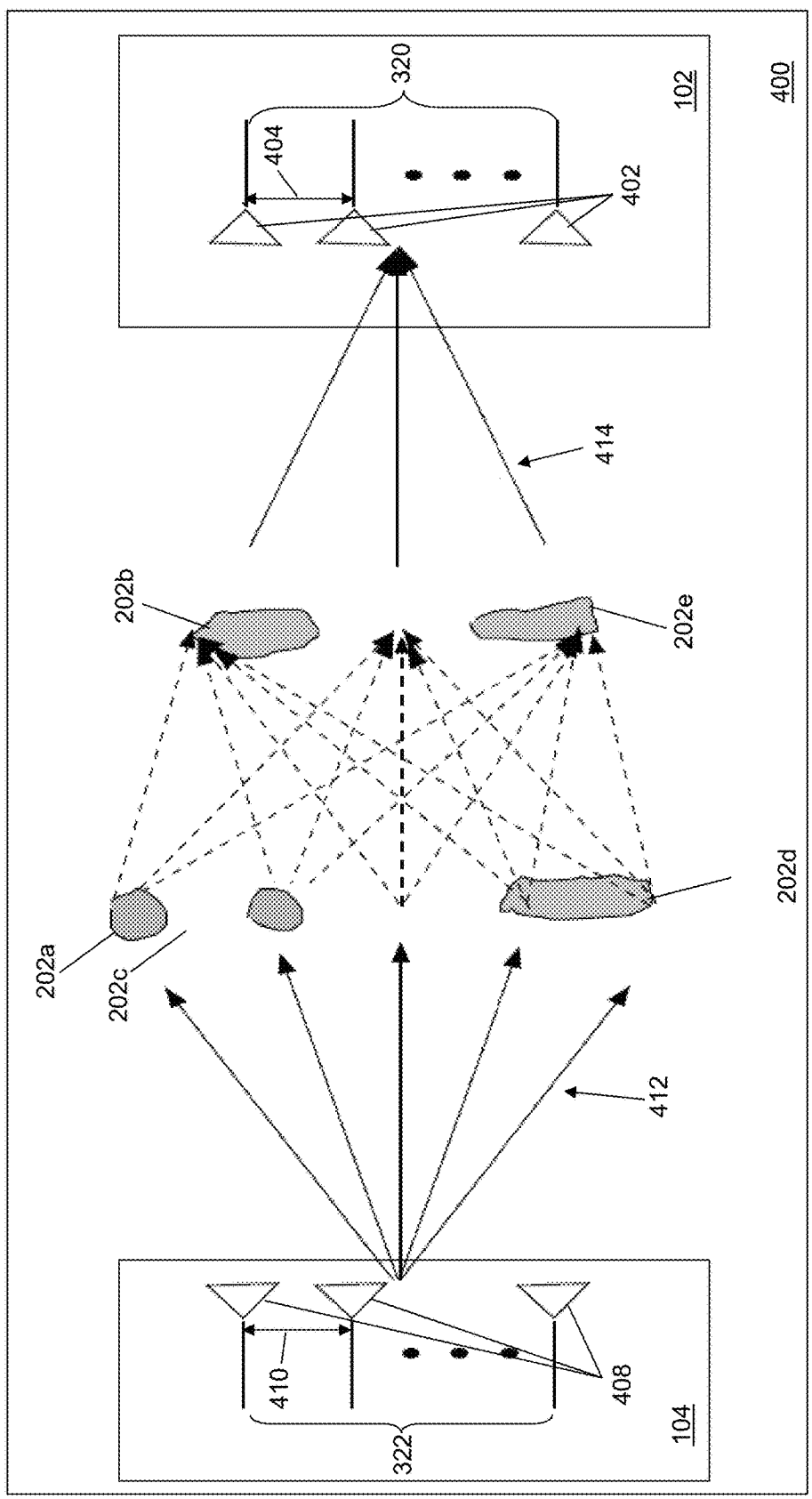
FIG. 4 depicts additional geometrical relationships between the transmitter and the receiver in the scattering environment in accordance with an illustrative embodiment.

The statistical characteristics of a wireless channel or sensing environment depend on the interaction between scattering environment 200 and a signal space of receiver 102 and transmitter 104. Signal space parameters include bandwidth (i.e. narrowband, wideband), a number of antennas, an antenna spacing, a pulse duration, a frequency, etc. Referring to FIG. 4, a virtual representation of a system 400 is shown. System 400 may include receiver 102 and transmitter 104. Receiver 102 may include receiver antenna 320 that includes a first plurality of antennas 402. Transmitter 104 may include transmitter antenna 322 that includes a second plurality of antennas 408. A number of antennas, $N_r$, of the first plurality of antennas 402 may be different from a number of antennas, $N_t$, of the second plurality of antennas 408. The first plurality of antennas 402 may be of the same or a different type of antenna as the second plurality of antennas 408.

In the illustrative embodiment of FIG. 4, the first plurality of antennas 402 and the second plurality of antennas 408 are arranged in a uniform linear array. The first plurality of antennas 402 and/or the second plurality of antennas 408 may be arranged to form a uniform or a non-uniform linear array, a rectangular array, a circular array, a conformal array, etc. An antenna of the first plurality of antennas 402 and/or the second plurality of antennas 408 may be a dipole antenna, a monopole antenna, a helical antenna, a microstrip antenna, a patch antenna, a fractal antenna, etc. The first plurality of antennas 402 and/or the second plurality of antennas 408 may be reconfigurable antenna arrays that can be adjusted spatially, for example, using microelectromechanical system (MEMS) components RF switches, etc. Thus, a first antenna spacing 404 between the first plurality of antennas 402 may be fixed or may be adjustable. Additionally, a second antenna spacing 410 between the second plurality of antennas 408 may be fixed or may be adjustable. The first antenna spacing 404 may be the same as or different from the second antenna spacing 410. For array configurations other than uniform linear arrays, aspects of array configuration other than antenna spacing may be adjusted.

Normalized spatial angles may be defined as $$\theta_r = \frac{d_r}{\lambda}\sin$$

$(\alpha_{r,l})$ and $$\theta_t = \frac{d_t}{\lambda}\sin$$

$(\alpha_{t,l})$, where $d_r$ is first antenna spacing 404, $\lambda$ is a wavelength of signal 100, $\alpha_{r,l}$ are the physical AoAs from the LoS path and the NLoS paths at receiver 102, l is an index to the LoS path (l=0) and the NLoS paths (l≥1), $d_t$ is second antenna spacing 410, and $\alpha_{t,l}$ are the physical AoDs from transmitter 104. As understood by a person of skill in the art, $$\lambda = \frac{c}{f},$$

where c is the speed of light and f is a frequency of signal 100. In an illustrative embodiment, $$d_r = d_t = \frac{\lambda}{2}.$$

In the illustrative embodiment of FIG. 4, system 400 includes first scatterer 202a, second scatterer 202b, a third scatterer 202c, a fourth scatterer 202d, and a fifth scatterer 202e. Though higher-order bounces between first scatterer 202a, second scatterer 202b, third scatterer 202c, fourth scatterer 202d, and fifth scatterer 202e may occur, in general, at high frequencies, such as millimeter (mm) wave frequencies and above, only the LoS path and single-bounce NLoS scattering paths are received with sufficient signal-to-noise ratio (SNR) as understood by a person of skill in the art.

A path loss for the LoS path may be defined as $$|\beta_0|^2 = G_t G_r \left(\frac{\lambda}{4\pi R_{los}}\right)^2,$$

where $G_t$ is a transmit gain, $G_r$ is a receive gain, and $R_{los}$ is the LoS range. A path loss for single-bounce NLoS paths may be defined as $$|\beta_{0,l}|^2 = \frac{G_t G_r RCS}{(4\pi)^3} \left(\frac{\lambda}{R_{t,l} R_{r,l}}\right)^2,$$

where RCS is a radar cross section of the respective scatterer, $R_{t,l}$ is an $l^{th}$ scatterer transmit range, and $R_{r,l}$ is the $l^{th}$ scatterer receive range. As understood by a person of skill in the art, RCS is a function of the properties of the $l^{th}$ scatterer, scattering angles, f, etc. A phase for the LoS path may be defined as $$\phi_0 = \frac{2\pi R_{los}}{\lambda}.$$

A phase for single-bounce NLoS paths may be defined as $$\phi_l = \frac{2\pi(R_{t,l} + R_{r,l})}{\lambda}.$$

The transmitted and received signals are related as r=Hx+ω, where x is the $N_t$-dimensional antenna domain transmitted signal 100, r is the $N_r$-dimensional signal received at receiver 102, H(f) is the $N_r \times N_t$ channel frequency response matrix coupling receiver 102 and transmitter 104, and ω is white Gaussian noise. H can be accurately modeled as $$H(f) = \sum_{l=0}^{N_p} |\beta_l| e^{j\phi_l} a_r(\theta_{r,l}) a_t^H(\theta_{t,l}) e^{-j2\pi\tau_l f}, \frac{-W}{2} < f < \frac{W}{2}$$

where $N_p$ denotes a number of LoS and NLoS paths, $\beta_l$ is a path loss, $\phi_l$ is a phase, $a_r(\theta_{r,l})$ is a response vector, $a_t^H(\theta_{t,l})$ is a steering vector, $\tau_l$ is a relative path delay for the respective path, and W is a bandwidth of operation. For illustration, $$a_r(\theta_{r,l}) = \frac{1}{\sqrt{N_r}}[a_{r,1}(\theta_{r,l}), \ldots, a_{r,N_r}(\theta_{r,l})]^T \text{ and } a_t(\theta_{t,l}) =$$

$$\frac{1}{\sqrt{N_t}}[a_{t,1}(\theta_{t,l}), \ldots, a_{t,N_t}(\theta_{t,l})]^T.$$

The elements of $a_r(\theta_{r,l})$ and $a_t(\theta_{t,l})$ and the normalized spatial angles $\theta_{r,l}$ and $\theta_{t,l}$ are defined by $$a_{r,i}(\theta_{r,l}) = e^{-j2\pi\theta_{r,l}(i-1)}, a_{t,i}(\theta_{t,l}) = e^{-j2\pi\theta_{t,l}(i-1)},$$

$$\theta_{r,l} = \frac{d_r}{\lambda}\sin(\alpha_{r,l}), \text{ and } \theta_{t,l} = \frac{d_t}{\lambda}\sin(\alpha_{t,l}).$$

According to the physical model, there are five parameters for each path: $\beta_l$, $\phi_l$, $\theta_{r,l}$, $\theta_{t,l}$, and $\tau_l$.

The LoS path (l=0) may be used as a reference path such that $\tau_0=0$ for the LoS path. For the non-LoS paths, $\tau_l \in (0, \tau_{max}]$ where $\tau_{max}$ denotes a delay spread of a propagation channel.

The relatively high dimensional nature of multiple antenna array systems results in a high computational complexity in practical systems. A beamspace multiple input, multiple output (MIMO) channel representation that provides an accurate and analytically tractable model for physical wireless channels is utilized where $H_b$ denotes a beamspace channel representation corresponding to the first plurality of antennas 402 and the second plurality of antennas 408, respectively. The beamspace representation is analogous to representing the channel in the wavenumber domain. Specifically, the beamspace representation describes the channel with respect to spatial basis functions defined by fixed angles that are determined by a receive spatial resolution of the first plurality of antennas 402 defined as $\Delta\theta_r=1/N_r$, and a transmit spatial resolution of the second plurality of antennas 408 defined as $\Delta\theta_t=1/N_t$, and by fixed delays that are determined by $$\Delta\tau = \frac{1}{W}.$$

The beamspace modeling includes spatial transmit beams 412 and spatial receive beams 414 between the second plurality of antennas 408 and the first plurality of antennas 402.

The physical model depends on AoA and AoD in a nonlinear manner. The beamspace channel representation $H_b$ is a linear representation of H(f) with respect to uniformly spaced virtual AoAs, AoDs, and delays such that $$H(f) \approx \frac{1}{\sqrt{N_r N_t}} \sum_{i=1}^{N_r} \sum_{k=1}^{N_t} \sum_{m=1}^{M} H_b(i, k, m) a_r(i\Delta\theta_r) a_t^H(k\Delta\theta_t) e^{-j2\pi\Delta\tau m f}$$

The beamspace channel coefficients $H_b(i, k, m)$ are a unitarily equivalent representation of the antenna domain channel frequency response matrix H(f) linearly represented in terms of fixed angles and path delays. In the sampled linear channel representation, the channel is completely characterized by the sampled angle-delay channel coefficients, $H_b(i, k, m)$, which can be computed from the channel frequency response matrix H(f) as $$H_b(i, k, m) = \frac{1}{\sqrt{N_r N_t} W} \int_{-\frac{W}{2}}^{\frac{W}{2}} a_r^H(i\Delta\theta_r) H(f) a_t(k\Delta t) e^{-j2\pi\Delta\tau m f} df$$

A "beamspace" angle-delay channel vector $h_b$ may be obtained by stacking $H_b(i, k, m)$ into a vector $h_b = \{H_b(i, k, m)\}_{i=1,\ldots,N_r; k=1,\ldots,N_t; m=0,\ldots,M}$. Estimation of the channel covariance can also be done using channel measurements. The channel frequency response matrix $H(f)$ is routinely estimated by estimating a multi-antenna channel matrix at different frequencies, as in orthogonal frequency division multiplexing systems. In single carrier systems, a channel impulse response matrix, $H(\tau)$ may be directly measured from which $H(f)$ can be calculated via a Fourier transform as understood by a person of skill in the art.

For an angle only implementation, $$H = \sum_{l=0}^{N_p} |\beta_l| e^{j\phi_l} a_r(\theta_{r,l}) a_t^H(\theta_{t,l})$$

and the beamspace channel representation $H_b$ is a linear representation of H with respect to uniformly spaced virtual AoAs and AoDs such that $$H = \frac{1}{\sqrt{N_r N_t}} \sum_{i=1}^{N_r} \sum_{k=1}^{N_t} H_b(i,k) a_r(i\Delta\theta_r) a_t^H(k\Delta\theta_t) = U_r H_b U_t^H \Leftrightarrow H_b = U_r^H H U_t$$

where $U_r$ and $U_t$ are unitary Discrete Fourier transform (DFT) matrices whose columns are orthogonal response vectors and steering vectors, respectively, defined by:

$$U_r = \frac{1}{N_r} [a_r(i\Delta\theta_r)]_{i \in \mathfrak{I}(N_r)}$$

$$U_t = \frac{1}{N_t} [a_t(k\Delta\theta_t)]_{k \in \mathfrak{I}(N_t)}$$

where $\mathfrak{I}(n) = \{1, 2, \ldots, n\}$.

For a time delay only implementation, $$H(f) = \sum_{l=0}^{N_p} |\beta_l| e^{j\phi_l} e^{-j2\pi\tau_l f}, \frac{-W}{2} < f < \frac{W}{2} \quad (1)$$

$$= \sum_{m=-\infty}^{\infty} h_m e^{-j2\pi\Delta\tau m f}, \frac{-W}{2} < f < \frac{W}{2} \quad (2)$$

$$\approx \sum_{m=0}^{M} h_m e^{-j2\pi\Delta\tau m f}, \frac{-W}{2} < f < \frac{W}{2} \quad (3)$$

Equation (1) is a single-antenna physical model for the channel frequency response $H(f)$. Equation (2) is an equivalent sampled representation of the channel, essentially a Fourier series representation of $H(f)$ induced by the finite bandwidth of operation W. The approximation in (3) restricts the range of values for m using the fact that $\tau_l \in (0, \tau_{max}]$ and the maximum index M is given by $M = \lceil \tau_{max} W \rceil$.

The "beamspace" channel coefficients in this case can be computed from the frequency response $H(f)$ as $$h_m = H_b(m) = \frac{1}{W} \int_{-\frac{W}{2}}^{\frac{W}{2}} H(f) e^{-j2\pi \frac{m}{W} f} df = h\left(\frac{m}{W}\right)$$

where $$h\left(\frac{m}{W}\right)$$

indicates that $h_m$ is a sampled version of $h(\tau)$ the (time-domain) channel impulse response which is related to $H(f)$ via a Fourier transform:

$$h(\tau) = \int_{-\frac{W}{2}}^{\frac{W}{2}} H(f) e^{-j2\pi f \tau} df \quad (4)$$

$$= \sum_{l=0}^{N_p} \beta_l W \operatorname{sinc}(W(\tau - \tau_n)) \quad (5)$$

$$= \sum_{m=-\infty}^{\infty} h_m W \operatorname{sinc}\left(W\left(\tau - \frac{l}{W}\right)\right) \quad (6)$$

$$\approx \sum_{m=0}^{M} h_m W \operatorname{sinc}\left(W\left(\tau - \frac{l}{W}\right)\right) \quad (7)$$

where (4) is a Fourier transform relationship between $H(f)$ and $h(\tau)$, (5) is a physical model for $h(\tau)$ corresponding to $H(f)$ in (1), and (6) and (7) are the sampled representations of $h(\tau)$ corresponding to the sampled representations of $H(f)$ in (2) and (3). The "beamspace" channel vector corresponding to the delay channel model is obtained by stacking $\{h_m\}$ into a vector $h_b = \{H_b(m)\}_{m=0,\ldots,M}$.

Figure 5:
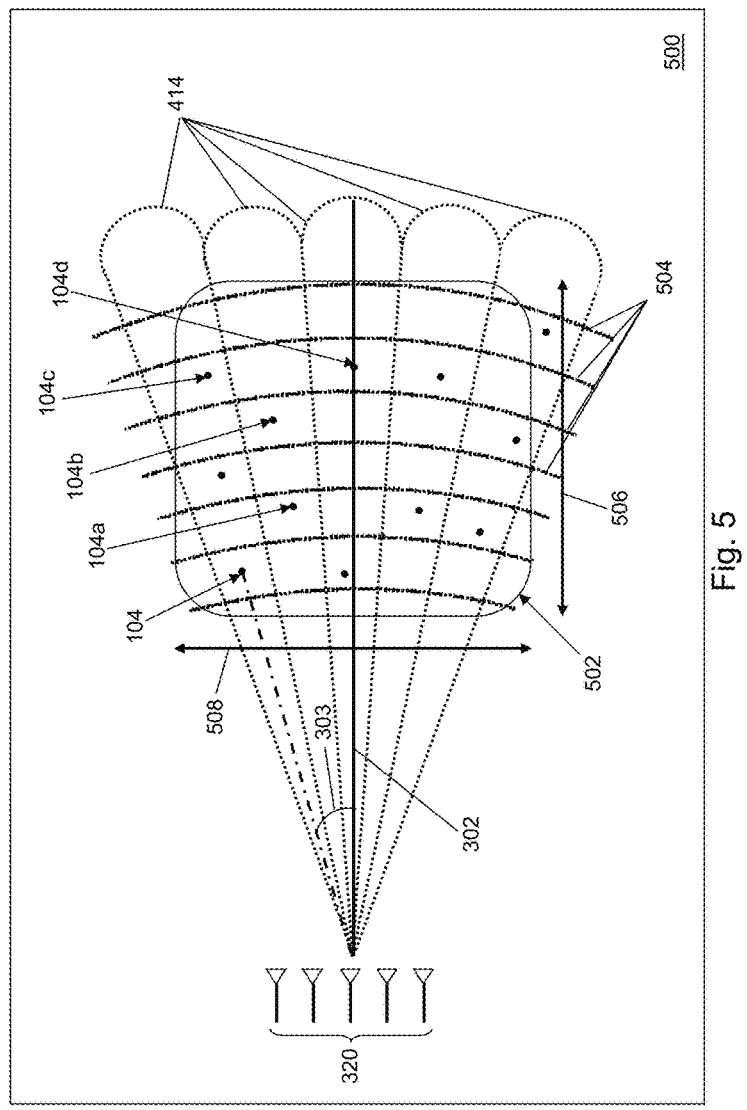
FIG. 5 depicts additional geometrical relationships between a plurality of transmitters and the receiver in accordance with an illustrative embodiment.

With reference to FIG. 5, a localization system 500 is shown. Localization system 500 may include a plurality of transmitters. For illustration, the plurality of transmitters may include transmitter 104, a second transmitter 104a, a third transmitter 104b, a fourth transmitter 104c, and a fifth transmitter 104d. Transmitter 104, second transmitter 104a, third transmitter 104b, fourth transmitter 104c, and fifth transmitter 104d may be the same or different types of transmitters that transmit signals that may be modulated and/or encoded in various manners as understood by a person of skill in the art. For example, the plurality of transmitters may include various devices that transmit signals wirelessly using any type of standardized or proprietary communication protocol, frequency, bandwidth, etc. Example devices include computing devices of any form factor including smart phones, tablets, laptops, desktops, servers, etc., vehicles, sensing elements, etc. that include the second plurality of antennas 408. Any transmitter of the plurality of transmitters is considered a radiator because it is configured to radiate electromagnetic waves as understood by a person of skill in the art.

The plurality of transmitters may be distributed over a region 502 randomly, uniformly, non-uniformly, etc. For example, cell phone devices may be distributed randomly throughout region 502. In the illustrative embodiment of FIG. 5, a non-uniform distribution of the plurality of transmitters is shown. The plurality of receive antennas 320 of receiver 102 are located sufficiently far from region 502 such that far-field assumptions apply. Region 502 can be spatially divided into spatial receive beams 414 and a plurality of time delay rings 504 based on the spatio-temporal resolution supported by the plurality of receive antennas 320 of receiver 102. Region 502 may have a distance width 506 and a distance height 508 from within which receiver 102 may receive signals from the plurality of transmitters. Region 502 may span azimuth angles of ±180 and elevation angles of ±90. While FIG. 5 illustrates the angles and delays for LoS paths, similar angles/delays are associated with different multipath components associated with each transmitter as in FIG. 3 and FIG. 4.

Figure 6:
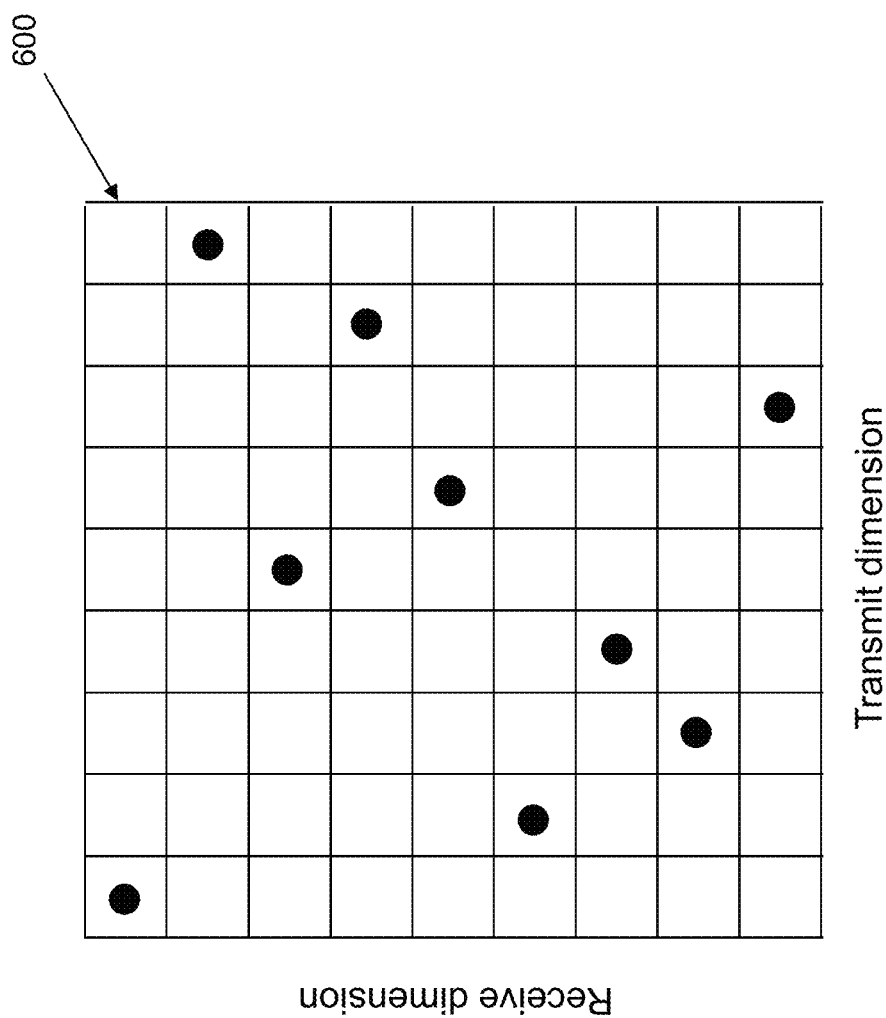
FIG. 6 depicts a sparse beamspace channel matrix in accordance with an illustrative embodiment.

Beamspace channel matrix $H_b$ may be sparse, particularly at higher frequencies resulting in a relatively small number of dominant non-vanishing entries For illustration, referring to FIG. 6, a sparse beamspace channel matrix 600 is shown. The first plurality of antennas 402 includes nine antennas, and the second plurality of antennas 408 includes nine antennas forming a 9×9 channel matrix 600. A dot in channel matrix 600 represents a dominant, non-vanishing entry. In the illustrative embodiment of FIG. 6, only nine of 81 possible beamspace channel entries are non-vanishing.

Figure 7:
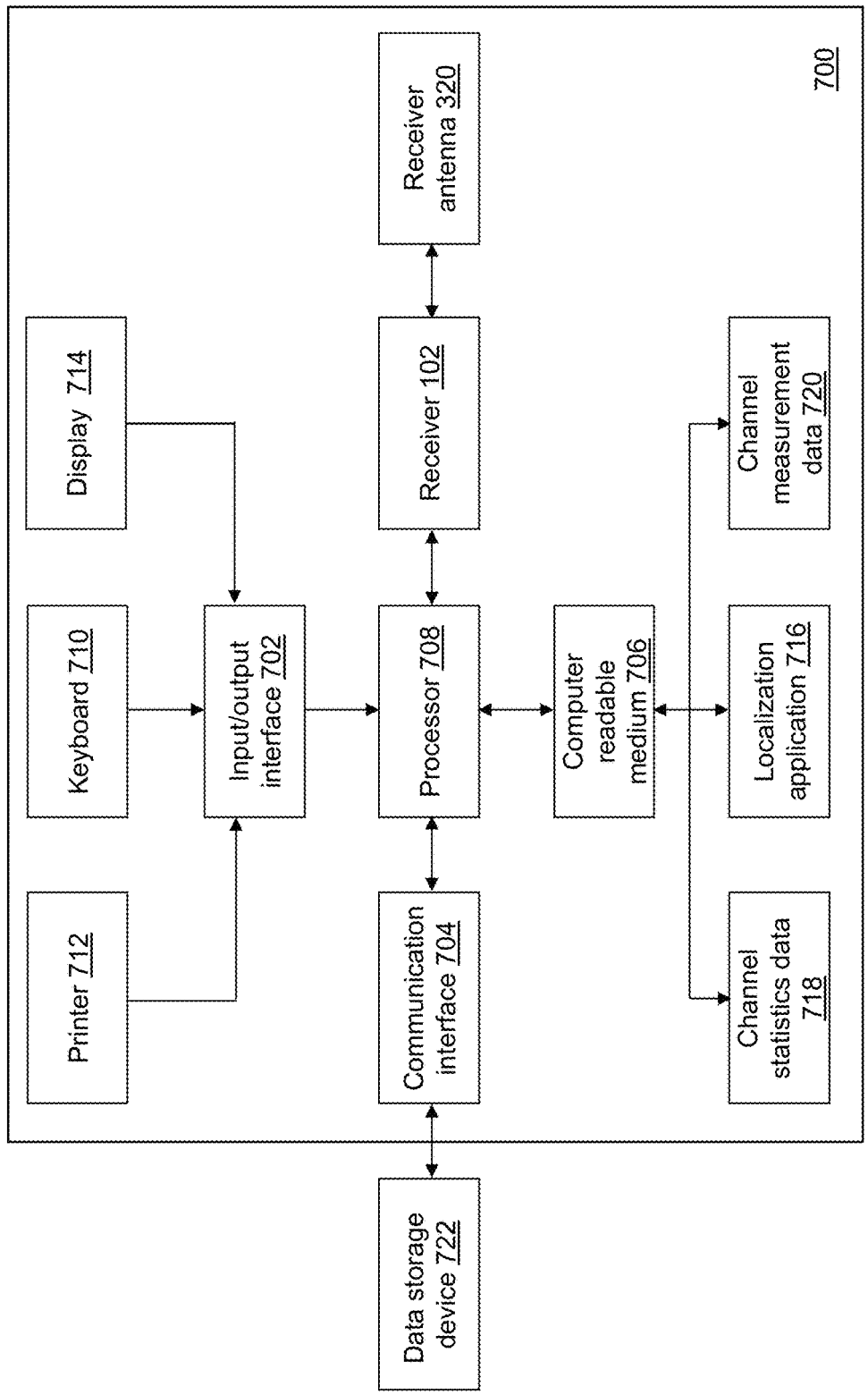
FIG. 7 depicts a block diagram of a receiver device in accordance with an illustrative embodiment.

With reference to FIG. 7, a block diagram of a receiver device 700 is shown in accordance with an illustrative embodiment. Receiver device 700 may include receiver 102, receiver antenna 320, an input/output (I/O) interface 702, a communication interface 704, a computer-readable medium 706, a processor 708, a keyboard 710, a printer 712, a display 714, a localization application 716, channel statistics data 718, and channel measurement data 720. Fewer, different, and/or additional components may be incorporated into receiver device 700.

Receiver 102 processes electromagnetic signals received by receiver antenna 320 under control of processor 708. Receiver 102 may be a transceiver. Alternately, receiver device 700 may include a separate transmitter. Receiver antenna 320 may be steerable. Receiver device 700 may include a plurality of receivers, transmitter, and/or transceivers that use the same or a different transmission/reception technology.

I/O interface 702 provides an interface for receiving information from the user for entry into receiver device 700 and/or for outputting information for review by the user of receiver device 700 as understood by those skilled in the art. I/O interface 702 may interface with various I/O technologies including, but not limited to, keyboard 710, printer 712, display 714, a mouse, a microphone, a track ball, a keypad, one or more buttons, a speaker etc. Receiver device 700 may have one or more I/O interfaces that use the same or a different I/O interface technology. The I/O interface technology further may be accessible by receiver device 700 through communication interface 704.

Communication interface 704 provides an interface for receiving and transmitting data between devices using various protocols, transmission technologies, and media as understood by those skilled in the art. Communication interface 704 may support communication using various transmission media that may be wired and/or wireless. Receiver device 700 may have one or more communication interfaces that use the same or a different communication interface technology. For example, receiver device 700 may support communication using an Ethernet port, a Bluetooth antenna, a telephone jack, a USB port, etc. Data and messages may be transferred between receiver device 700 and/or a data storage device 722 using communication interface 704.

Computer-readable medium 706 is an electronic holding place or storage for information so the information can be accessed by processor 708 as understood by those skilled in the art. Computer-readable medium 706 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Receiver device 700 may have one or more computer-readable media that use the same or a different memory media technology. For example, computer-readable medium 706 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Receiver device 700 also may have one or more drives that support the loading of a memory media such as a CD, DVD, an external hard drive, etc. One or more external hard drives further may be connected to receiver device 700 using communication interface 704.

Processor 708 executes instructions as understood by those skilled in the art. The instructions may be carried out by a special purpose computer, logic circuits, or hardware circuits. Processor 708 may be implemented in hardware and/or firmware. Processor 708 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 708 operably couples with I/O interface 702, with receiver 102, with communication interface 704, and with computer-readable medium 706 to receive, to send, and to process information. Processor 708 may retrieve a set of instructions from a permanent memory device and copy the instructions in an executable form to a temporary memory device that is generally some form of RAM. Receiver device 700 may include a plurality of processors that use the same or a different processing technology.

Localization application 716 performs operations associated with defining channel measurement data 720 and/or channel statistics data 718 and with determining a location of transmitter 104 using channel measurement data 720 and/or channel statistics data 718. Some or all of the operations described herein may be embodied in localization application 716. The operations may be implemented using hardware, firmware, software, or any combination of these methods. Referring to the example embodiment of FIG. 7, localization application 716 is implemented in software (comprised of computer-readable and/or computer-executable instructions) stored in computer-readable medium 706 and accessible by processor 708 for execution of the instructions that embody the operations of localization application 716. Localization application 716 may be written using one or more programming languages, assembly languages, scripting languages, etc.

Localization application 716 may be implemented as a Web application. For example, localization application 716 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Figure 8:
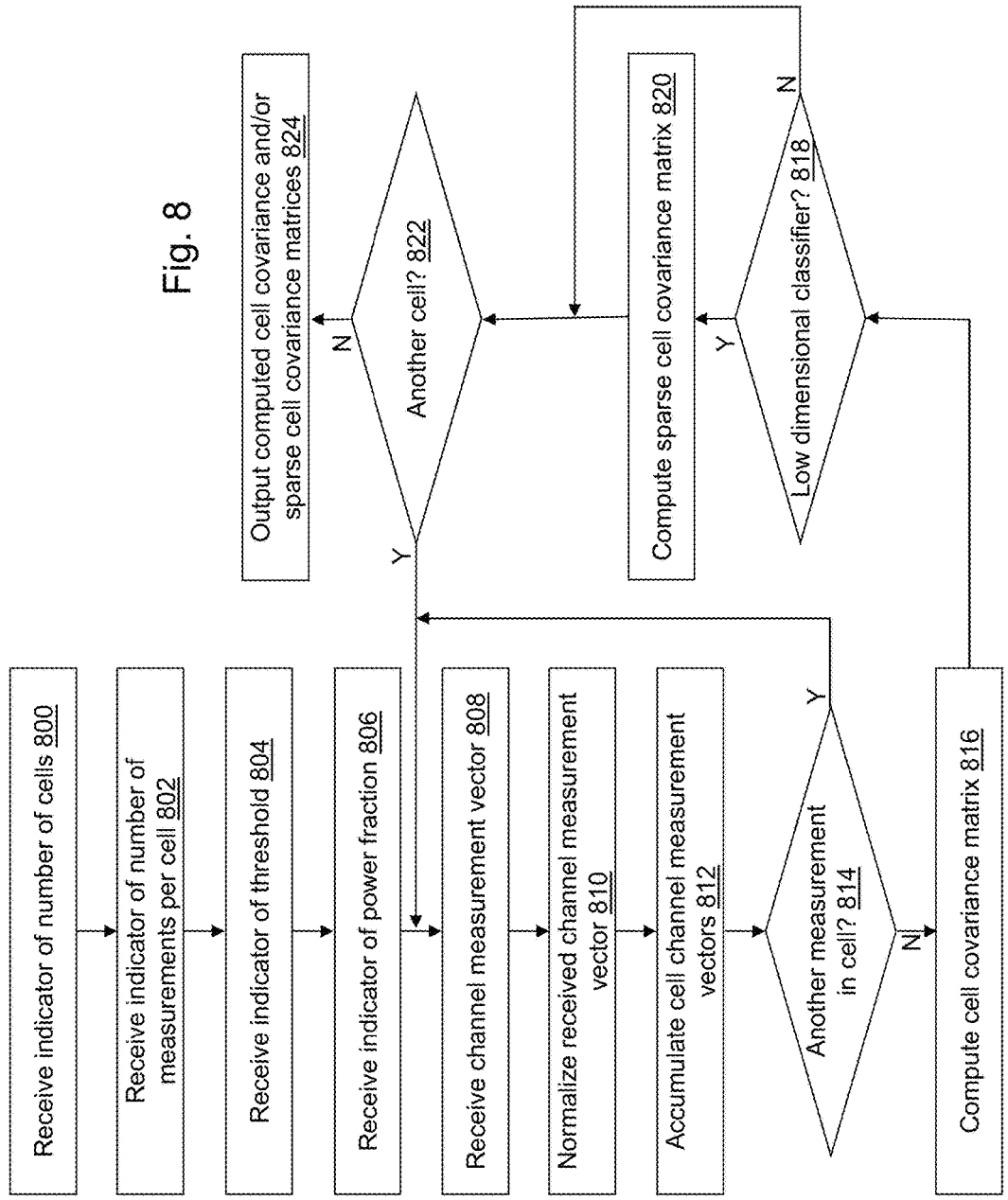
FIG. 8 depicts a flow diagram illustrating examples of operations performed by a localization application of the receiver device of FIG. 7 in accordance with an illustrative embodiment.

Referring to FIG. 8, example operations associated with localization application 716 are described. Additional, fewer, or different operations may be performed depending on the embodiment. The order of presentation of the operations of FIG. 8 is not intended to be limiting. Although some of the operational flows are presented in sequence, the various operations may be performed in various repetitions, concurrently (in parallel, for example, using threads), and/or in other orders than those that are illustrated. For example, a user may execute localization application 716, which causes presentation of a first user interface window, which may include a plurality of menus and selectors such as drop down menus, buttons, text boxes, hyperlinks, etc. associated with localization application 716 as understood by a person of skill in the art. The plurality of menus and selectors may be accessed in various orders. An indicator may indicate one or more user selections from a user interface, one or more data entries into a data field of the user interface, one or more data items read from computer-readable medium 706 or otherwise defined with one or more default values, etc. that are received as an input by localization application 716.

In an operation 800, a first indicator is received that indicates a number of cells for which to calculate covariance matrices. For example, the first indicator indicates a value of the number of cells. The first indicator may be received by localization application 716 after a selection from a user interface window or after entry by a user into a user interface window. A default value for the number of cells may further be stored, for example, in computer-readable medium 706. In an alternative embodiment, the number of cells may not be selectable or received.

A geographic region may be defined relative to a location of receiver device 700 similar to region 502. For illustration, referring to FIG. 11, the number of cells may define a grid based on a grid distance width 1100, a grid distance height 1102, and a resolution value 1104 that defines a size of each cell. The number of cells may be determined from values defined for grid distance width 1100, grid distance height 1102, and resolution value 1104.

Referring again to FIG. 8, in an operation 802, a second indicator is received that indicates a number of measurements to obtain per cell. For example, the second indicator indicates a value of the number of measurements per cell. The second indicator may be received by localization application 716 after a selection from a user interface window or after entry by a user into a user interface window. A default value for the number of measurements per cell may further be stored, for example, in computer-readable medium 706. In an alternative embodiment, the number of measurements per cell may not be selectable.

In an operation 804, a third indicator is received that indicates a threshold for selecting channel entries from beamspace channel matrix $H_b$. For example, the third indicator indicates a value of the threshold used as described further below. The third indicator may be received by localization application 716 after a selection from a user interface window or after entry by a user into a user interface window. A default value for the threshold may further be stored, for example, in computer-readable medium 706. In an alternative embodiment, the threshold may not be selectable.

In an operation 806, a fourth indicator is received that indicates a power fraction for optionally determining the threshold for selecting channel entries from beamspace channel matrix $H_b$. For example, the fourth indicator indicates a value of the power fraction used as described further below. The fourth indicator may be received by localization application 716 after a selection from a user interface window or after entry by a user into a user interface window. A default value for the power fraction may further be stored, for example, in computer-readable medium 706. In an alternative embodiment, the power fraction may not be selectable. In an illustrative embodiment, the power fraction is received and used to calculate the threshold.

In an operation 808, channel measurement vector data $h_b$ is received. For example, a signal is received by the first plurality of antennas 402 of receiver antenna 320 and processed by receiver 102. The channel measurement vector data may be determined by processor 708 using data received from receiver 102. The channel measurement vector may be calculated as $h_b = \text{vec}(H_b)$. The received signal may be created by transmitting a signal from transmitter 104 positioned at a location in a cell selected from the geographic region. The channel measurement vector includes a signal value or waveform measured at each of the first plurality of antennas 402 in response to signal 100 transmitted from a radiator such as transmitter 104 at the location in the cell selected from the geographic region. For example, the transmitted signal may be a channel sounding signal transmitted by a test radiator.

In an operation 810, the received channel measurement vector data may be normalized, for example, using $E[\|h_b\|^2]=1$. In an operation 812, cell channel measurement vector data is accumulated, for example, by adding the values vectorially or by accumulating multiple channel vectors into a matrix. Channel measurement data 720 may include the received channel measurement vector data and/or the normalized, received channel measurement vector data. Channel vector normalization for each may be done after the accumulation of data for each cell from which the average channel power, $\sigma^2 = E[\|h_b\|^2]$ can be determined.

In an operation 814, a determination is made concerning whether or not another measurement is made from the cell. If another measurement is to be made from the cell, processing continues in operation 808 to receive another channel measurement vector. If another measurement is not to be made from the cell, processing continues in an operation 816.

For example, a counter may be used to determine when the number of measurements per cell has been received for the cell. In another illustrative embodiment, the transmitted signal may include a cell number and a cell measurement number and may indicate when the measurements have been completed for the cell meaning the number of cells and the number of measurements per cell is not needed. For subsequent measurements in the cell, transmitter 104 may be moved to different locations within the cell.

In operation 816, a cell covariance matrix is computed for the cell. The cell covariance matrix may be computed using $$\Sigma_{b,k} = \frac{1}{N} \sum_{i=1}^{N} h_b(x_{r,i}, y_{r,i}) h_b^H(x_{r,i}, y_{r,i}),$$

where N is a number of the different locations within the cell (the number of measurements per cell), $h_b(x_{r,i}, y_{r,i})$ is a respective channel measurement vector at a location $x_{r,i}, y_{r,i}$ of the different locations within the cell, and $h_b^H(x_{r,i}, y_{r,i})$ is a complex conjugate transpose of $h_b(x_{r,i}, y_{r,i})$.

In an operation 818, a determination is made concerning whether or not a low dimensional classifier may be used. If a low dimensional classifier may be used, processing continues in an operation 820. If a low dimensional classifier is not used, processing continues in an operation 822.

In operation 820 a sparse cell covariance matrix is computed from the computed cell covariance matrix. The sparse cell covariance matrix may be computed using the mask $\mathcal{M} = \{i: \Sigma_{b,k}(i,i) \geq \gamma \max_i E_{b,k}(i,i)\}$, where i is an index to $\Sigma_{b,k}$, and $\gamma$ is a value of the threshold defined from operation 804. The value of the threshold may be defined such that $\Sigma_{i \in \mathcal{M}} \Sigma_{b,k}(i,i) \geq \eta \sigma^2$, where $\eta$ is a value of the power fraction defined from operation 806. The value of the power fraction may be between zero and one, and $\sigma^2 = tr(\Sigma_{b,k})$ is a total channel power. The threshold $\gamma$ is chosen so that $\mathcal{M}$ for each cell captures a specified (large) fraction $\eta$ of the channel power.

In operation 822, a determination is made concerning whether or not another cell is to be processed. If another cell is to be processed, processing continues in operation 808 to process another channel measurement vector for a next cell as the cell. If another cell is not to be processed, processing continues in an operation 824.

For example, a cell counter may be used to determine when the number of cells has been processed. In another illustrative embodiment, the transmitted signal may include a cell number and a cell measurement number and may indicate when the cell processing has been completed. When another cell is processed, transmitter 104 may be moved to a different cell within the grid defined for the geographic region. For example, referring again to FIG. 11, cell 2 is selected; on a next iteration, cell 3 is selected; and so on until each cell is processed. Of course, the cells may be processed in various orders.

Referring again to FIG. 8, in operation 824, the computed cell covariance matrix and/or the computed sparse cell covariance matrix are output. As examples, the computed cell covariance matrix and/or the computed sparse cell covariance matrix may be stored in computer-readable medium 108, may be stored to data storage device 722, and/or may be output to the user using display 714 or printer 712. Channel statistics data 718 may include the computed cell covariance matrix and/or the computed sparse cell covariance matrix. Channel statistics data 718 further may include a geographic location for each cell within the grid defined for the geographic region. The geographic location may be defined in various coordinate systems. The geographic location may define a center of each cell though the geographic location could be defined for other locations within the cell.

Figure 9C:
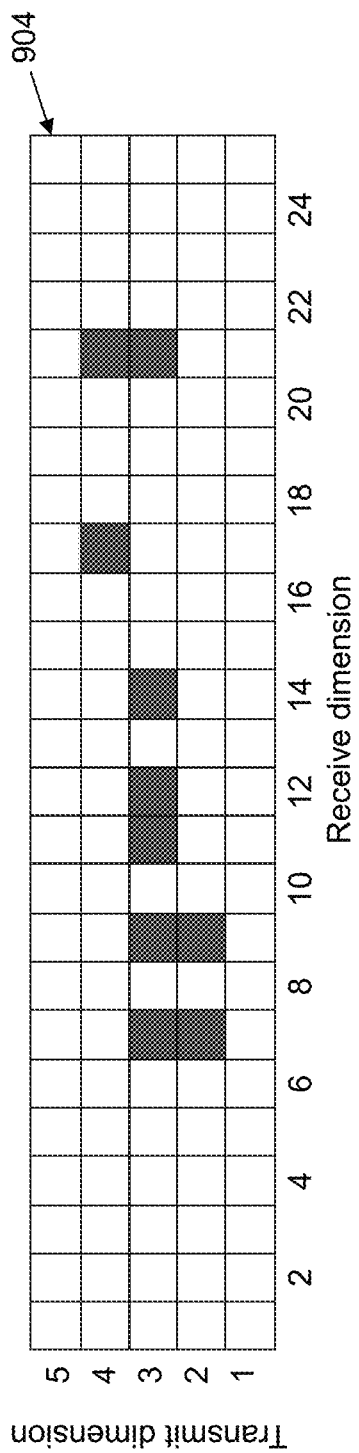

For illustration, FIGS. 9a-9d show sparse cell covariance matrices for different cells. Referring to FIG. 9a, a first sparse cell covariance matrix 900 is shown for cell 1 of FIG. 11. First sparse cell covariance matrix 900 includes twelve non-zero entries determined based on the mask $\mathcal{M} = \{i: \Sigma_{b,k}(i,i) \geq \gamma \max_i \Sigma_{b,k}(i,i)\}$. The index i is to channel measurement vector $h_b$, which is an $N_r N_t \times 1$ column vector though first sparse cell covariance matrix 900 is shown as a $N_r \times N_t$ matrix. For this illustrative embodiment, $\mathcal{M} = 32, 34, 57, 59, 60, 61, 62, 64, 89, 96, 97, 117$ for cell 1 counting row-wise. Values associated with each index in the mask represent the channel signature vector entries that are significant.

Figure 11:
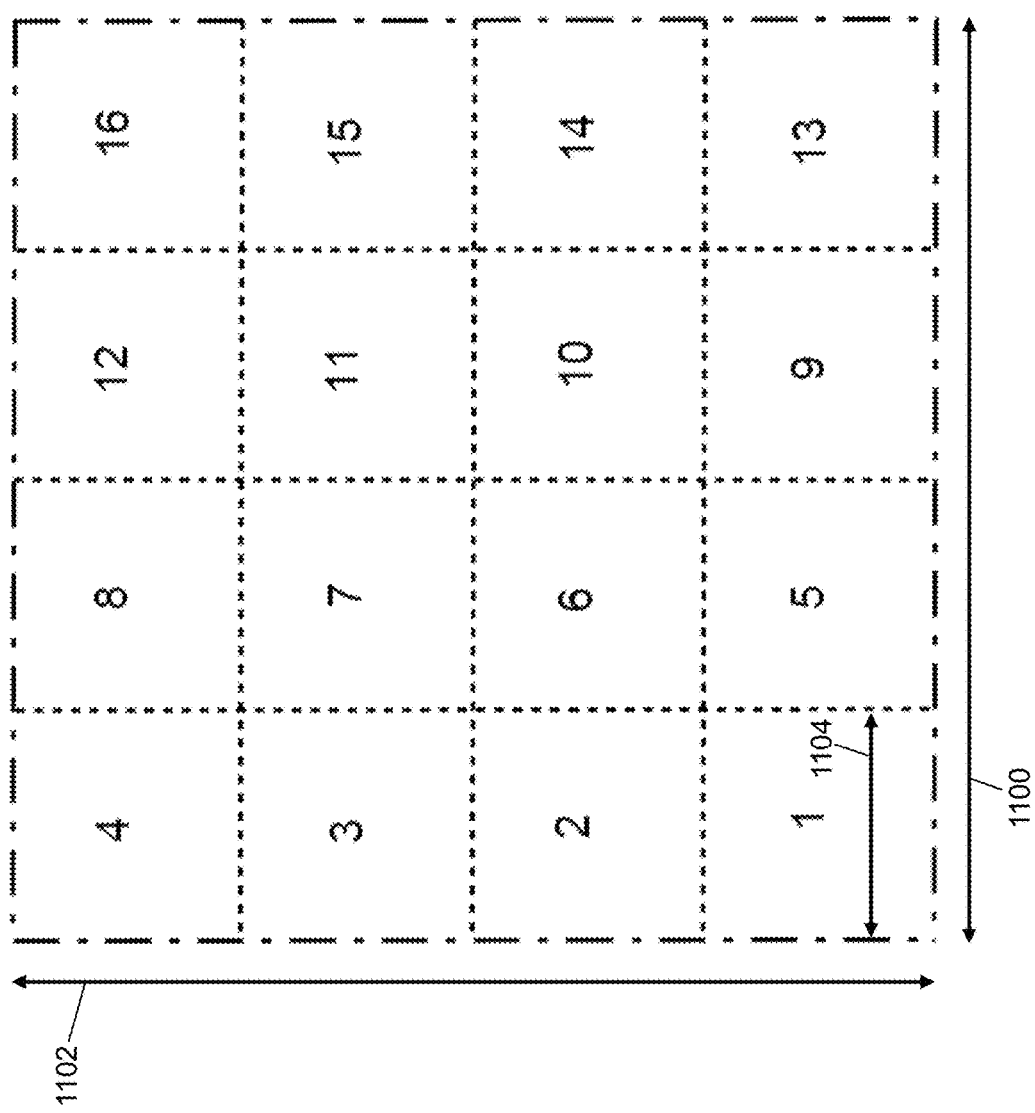
FIG. 11 depicts a spatial grid in accordance with an illustrative embodiment.

Referring to FIG. 9b, a second sparse cell covariance matrix 902 is shown for cell 4 of FIG. 11. Second sparse cell covariance matrix 902 includes ten non-zero entries determined based on the mask $\mathcal{M} = \{i: \Sigma_{b,k}(i,i) \geq \gamma \max_i \Sigma_{b,k}(i,i)\}$. The index i is to channel measurement vector $h_b$, which is an $N_r N_t \times 1$ column vector though second sparse cell covariance matrix 902 is shown as a $N_r \times N_t$ matrix. For this illustrative embodiment, $\mathcal{M} = 32, 34, 57, 64, 65, 66, 67, 71, 92, 96$ for cell 4.

Referring to FIG. 9c, a third sparse cell covariance matrix 904 is shown for cell 13 of FIG. 11. Third sparse cell covariance matrix 904 includes ten non-zero entries determined based on the mask $\mathcal{M} = \{i: \Sigma_{b,k}(i,i) \geq \gamma \max_i \Sigma_{b,k}(i,i)\}$. The index i is to channel measurement vector $h_b$, which is an $N_r N_t \times 1$ column vector though third sparse cell covariance matrix 904 is shown as a $N_r \times N_t$ matrix. For this illustrative embodiment, $\mathcal{M} = 32, 34, 57, 64, 65, 67, 71, 72, 92, 96$ for cell 13.

Figure 9D:
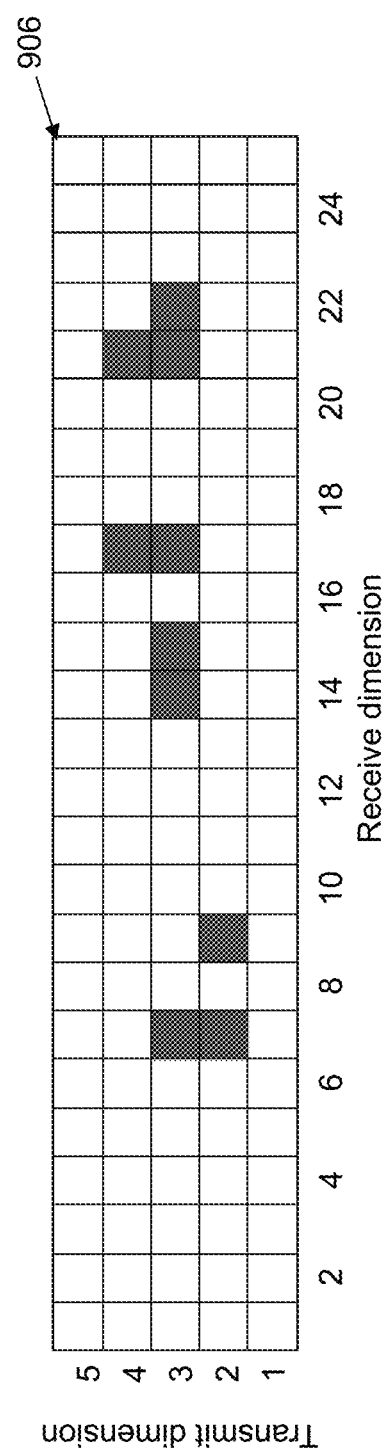

Referring to FIG. 9d, a fourth sparse cell covariance matrix 906 is shown for cell 16 of FIG. 11. Fourth sparse cell covariance matrix 906 includes ten non-zero entries determined based on the mask $\mathcal{M} = \{i: \Sigma_{b,k}(i,i) \geq \gamma \max_i \Sigma_{b,k}(i,i)\}$. The index i is to channel measurement vector $h_b$, which is an $N_r N_t \times 1$ column vector though fourth sparse cell covariance matrix 906 is shown as a $N_r \times N_t$ matrix. For this illustrative embodiment, $\mathcal{M} = 32, 34, 57, 59, 61, 62, 64, 71, 92, 96$ for cell 16.

Figure 10:
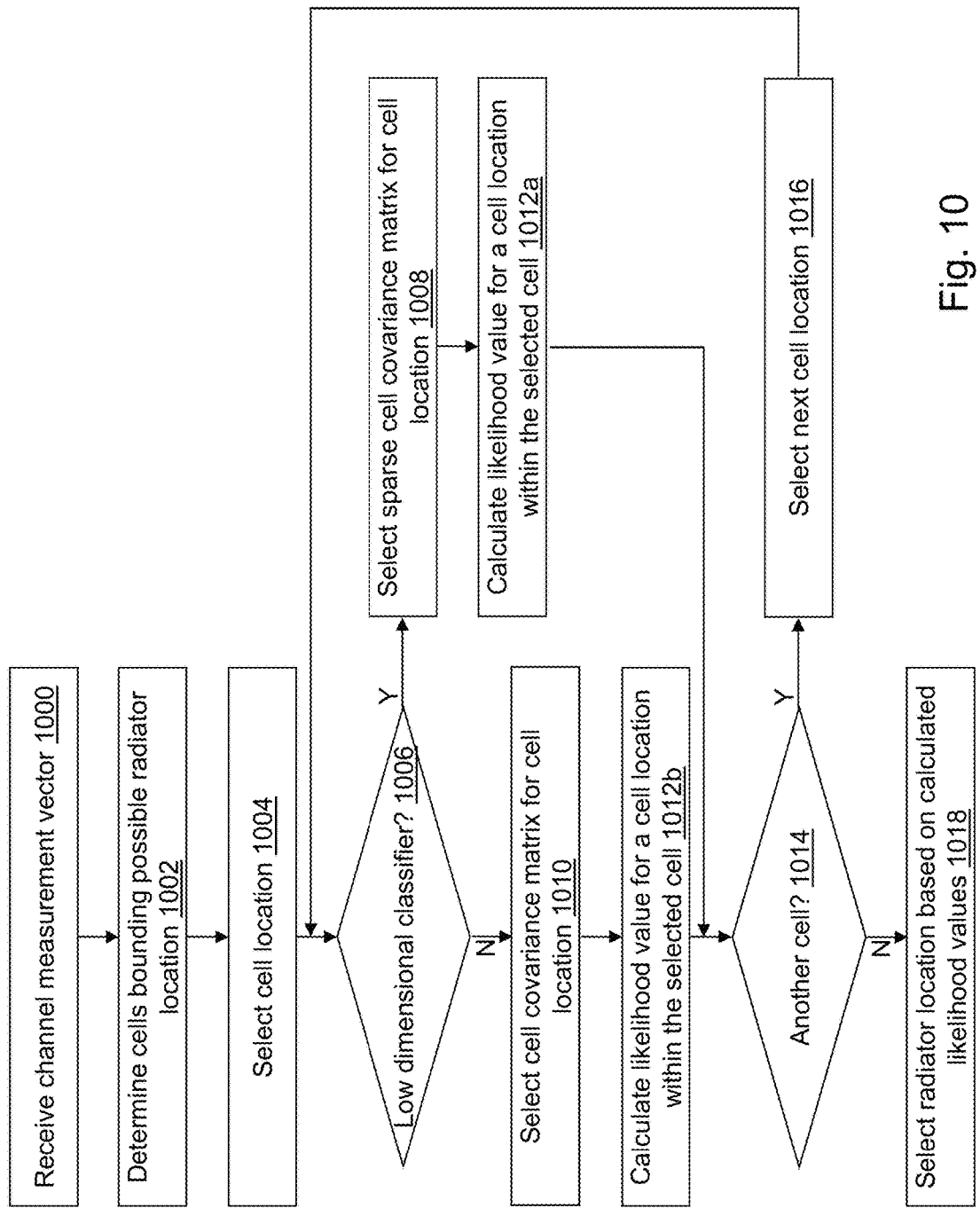
FIG. 10 depicts a flow diagram illustrating further examples of operations performed by the localization application of the receiver device of FIG. 7 in accordance with an illustrative embodiment.

Referring to FIG. 10, additional example operations associated with localization application 716 are described. Again, additional, fewer, or different operations may be performed depending on the embodiment. The order of presentation of the operations of FIG. 10 is not intended to be limiting.

In an operation 1000, channel measurement vector data is received from a radiator such as transmitter 104. The received channel measurement vector data may be normalized, for example, using the average channel power for the chosen cell location determined in the channel covariance estimation phase, or the channel measurement vector could be normalized to have unit norm: $\|h_b\|^2 = 1$. Channel measurement data 720 may include the received channel measurement vector data and/or the normalized, received channel measurement vector data. Localization application 716 may determine a geographic location of the radiator.

In an operation 1002, cells bounding a location of the radiator are determined. In an illustrative embodiment, the cells are the cells associated with the computed cell covariance matrix and/or the computed sparse cell covariance matrix output in operation 824.

In an operation 1004, a first cell is selected from the cells bounding the location of the radiator. For example, referring again to FIG. 11, sixteen cells bound the radiator location, and cell 1 is selected.

Referring again to FIG. 10, in an operation 1006 and similar to operation 818, a determination is made concerning whether or not a low dimensional classifier is used. If a low dimensional classifier is used, processing continues in an operation 1008. If a low dimensional classifier is not used, processing continues in an operation 1010.

In operation 1008, a sparse cell covariance matrix is selected for the first cell. For example, a number of the first cell may be used as an index to select the sparse cell covariance matrix from channel statistics data 718 stored on computer-readable medium 108, or alternately, on data storage device 722.

In an operation 1012a, a likelihood value is calculated for the first cell. For example, the likelihood value may be calculated using $\log(|\Sigma_{b,k}|) + h_b^H \Sigma_{b,k}^{-1} h_b$, where $\Sigma_{b,k}$ is the selected sparse cell covariance matrix, $\Sigma_{b,k}^{-1}$, is an inverse of $\Sigma_{b,k}$, $h_b$ is the corresponding sparse version of the channel measurement vector received in operation 1000 and determined using the sparsity mask $\mathcal{M}$ for the cell, and $h_b^H$ is a complex conjugate transpose of $h_b$.

In operation 1010, a cell covariance matrix is selected for the first cell. For example, a number of the first cell may be used as an index to select the cell covariance matrix from channel statistics data 718 stored on computer-readable medium 108, or alternately, on data storage device 722.

In an operation 1012*b*, a likelihood value is calculated for the first cell. For example, the likelihood value may be calculated using $\log(|\Sigma_{b,k}|) + h_b^H \Sigma_{b,k}^{-1} h_b$, where $\Sigma_{b,k}$ is the selected cell covariance matrix, $\Sigma_{b,k}^{-1}$, is an inverse of $\Sigma_{b,k}$, $h_b$ is the channel measurement vector received in operation 1000, and $h_b^H$ is a complex conjugate transpose of $h_b$.

In an operation 1014 and similar to operation 822, a determination is made concerning whether or not another cell is to be processed. If another cell is to be processed, processing continues in an operation 1016 to process a next cell. If another cell is not to be processed, processing continues in an operation 1018.

In operation 1016, a next cell is selected from the cells bounding the location of the radiator and processing continues in operation 1006 to process the next cell as the first cell. For example, referring again to FIG. 11, cell 2 is selected; on a next iteration, cell 3 is selected; and so on until each cell is processed. Of course, the cells may be processed in various orders.

In operation 1018, a radiator location is selected based on the calculated likelihood values. For example, a geographic location associated with $\arg\min_{k=1}[\log(|\Sigma_{b,k}|) + h_b^H \Sigma_{b,k}^{-1} h_b]$ may be selected as the radiator location.

Figure 12:
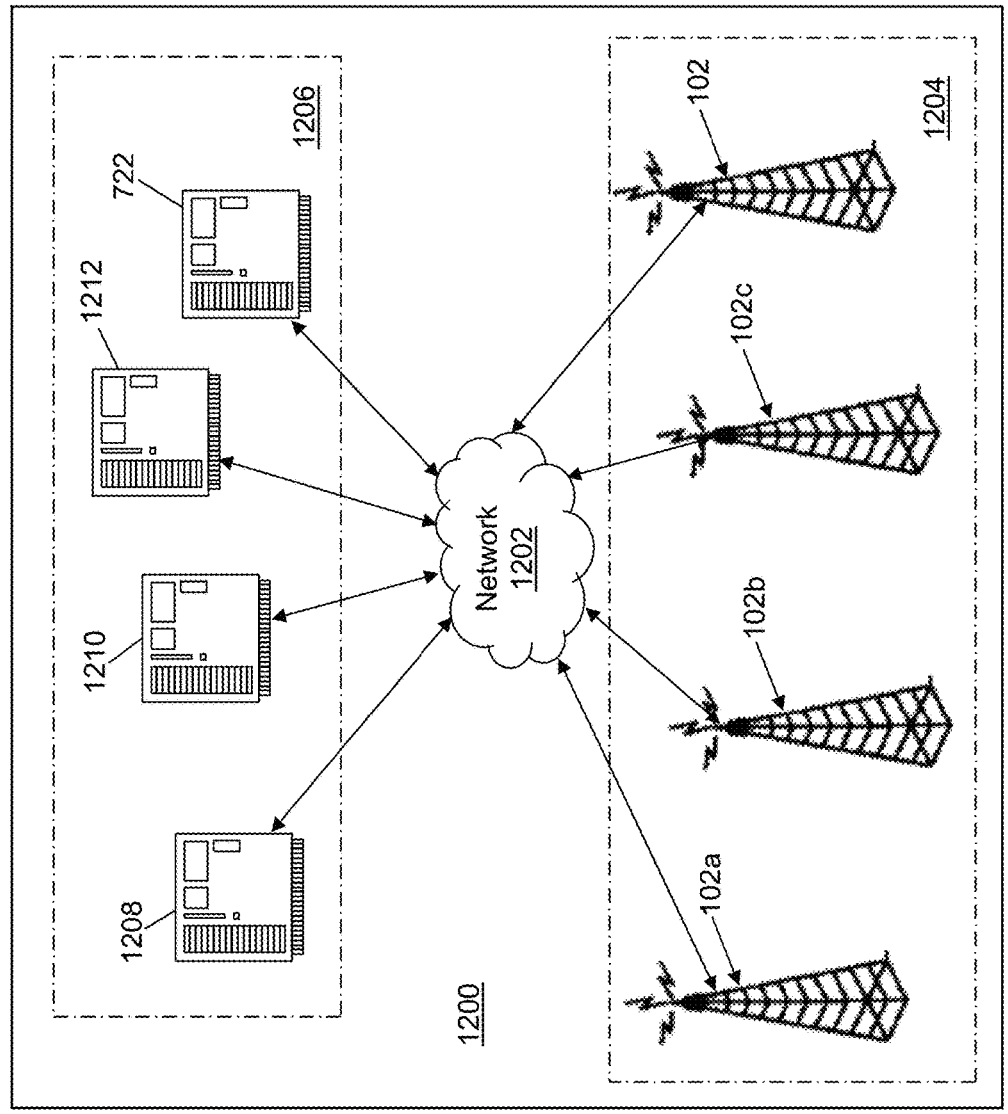
FIG. 12 depicts a block diagram of a localization system in accordance with an illustrative embodiment.

Referring to FIG. 12, a block diagram of a localization system 1200 is shown in accordance with an illustrative embodiment. In an illustrative embodiment, localization system 1200 may include a network 1202, a plurality of receiver systems 1204, and data storage systems 1206. Data storage systems 1206 store data such as channel statistics data 718 and/or channel measurement data 720 for one or more of the plurality of receiver systems 1204.

The components of localization system 1200 may be located in a single room or adjacent rooms, in a single facility, and/or may be distributed geographically from one another. Each of the plurality of receiver systems 1204 and data storage systems 1206 may be composed of one or more discrete devices.

Network 1202 may include one or more networks of the same or different types. Network 1202 can be any type of wired and/or wireless public or private network including a cellular network, a local area network, a wide area network such as the Internet, etc. Network 1202 further may comprise sub-networks and consist of any number of devices.

The plurality of receiver systems 1204 can include any number and types of receiver system. Receiver 102 is an example device of the plurality of receiver systems 1204. For illustration, the plurality of receiver systems 1204 may further include a second receiver 102*a*, a third receiver 102*b*, and a fourth receiver 102*c*.

Data storage device 722 is an example device of data storage systems 1206. For illustration, data storage systems 1206 include data storage device 722, a first data storage device 1208, a second data storage device 1210, and a third data storage device 1212. Data storage systems 1206 can include any number and form factor of computing devices that may be organized into subnets, grids, clusters, clouds, etc. The computing devices of data storage systems 1206 send and receive communications through network 1202 to/from one or more of the plurality of receiver systems 1204. The one or more computing devices of data storage systems 1206 may communicate using various transmission media that may be wired and/or wireless as understood by those skilled in the art.

Figure 13:
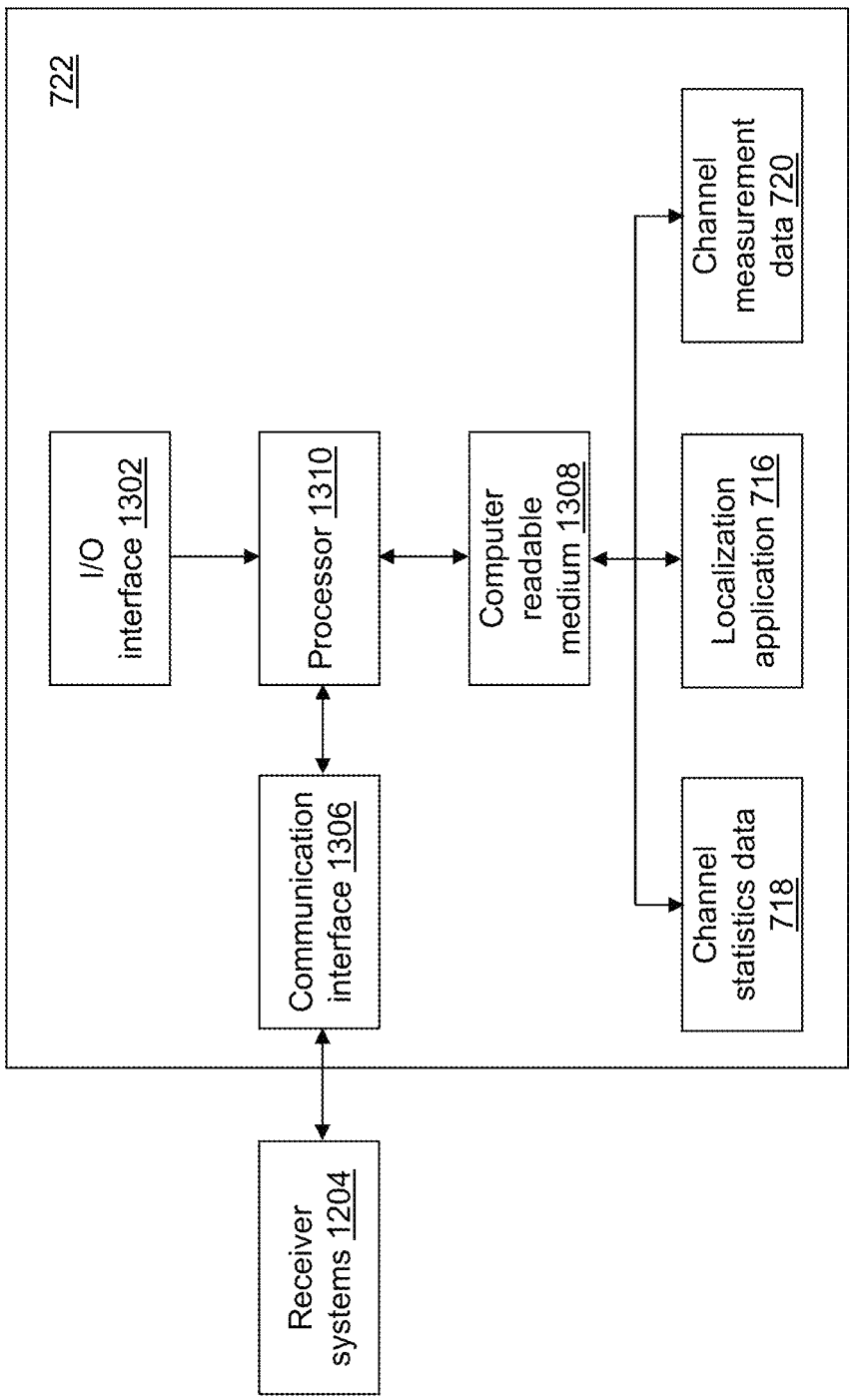
FIG. 13 depicts a block diagram of a data storage device in accordance with an illustrative embodiment.

Referring to FIG. 13, a block diagram of data storage device 722 is shown in accordance with an illustrative embodiment. Data storage device 722 may include a second I/O interface 1302, a second communication interface 1304, a second computer-readable medium 1306, a second processor 1308, localization application 716, channel statistics data 718, and channel measurement data 720. Fewer, different, and additional components may be incorporated into data storage device 722.

Second I/O interface 1302 provides the same or similar functionality as that described with reference to I/O interface 702 of receiver device 700 though referring to data storage device 722. Second communication interface 1306 provides the same or similar functionality as that described with reference to communication interface 704 of receiver device 700 though referring to data storage device 722. Data and messages may be transferred between data storage device 722 and the plurality of receiver systems 1204 using second communication interface 1306. Second computer-readable medium 1308 provides the same or similar functionality as that described with reference to computer-readable medium 706 of receiver device 700 though referring to data storage device 722. Second processor 1310 provides the same or similar functionality as that described with reference to processor 708 of receiver device 700 though referring to data storage device 722.

Various levels of integration between the components of localization system 1200 may be implemented without limitation as understood by a person of skill in the art.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, in the detailed description, using "and" or "or" is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:

(a) define a test channel measurement vector, wherein the test channel measurement vector includes a test signal value measured at each of a plurality of antennas in response to a test signal transmitted from a test radiator positioned in a first cell of a plurality of cells defined for a region;

(b) calculate a cell covariance matrix for the first cell from the defined test channel measurement vector;

(c) store the calculated cell covariance matrix in association with an indicator of the first cell;

repeat (a) through (c) with each remaining cell of the plurality of cells as the first cell;

define a channel measurement vector, wherein the channel measurement vector includes a signal value measured at each of the plurality of antennas in response to a signal transmitted from a radiator;

(d) select the stored cell covariance matrix of the first cell;

(e) calculate a likelihood value that the radiator is located in the first cell using the selected cell covariance matrix and the defined channel measurement vector;

(f) repeat (d) and (e) with each remaining cell of the plurality of cells as the first cell; and determine a geographic location for the radiator based on the calculated likelihood value for each cell of the plurality of cells.

2. The computer-readable medium of claim 1, wherein the likelihood value is calculated using $-(\log(|\Sigma_{b,k}|)+h_b^H \Sigma_{b,k}^{-1} h_b)$, where $\Sigma_{b,k}$ is the selected cell covariance matrix, $\Sigma_{b,k}^{-1}$ is an inverse of $\Sigma_{b,k}$, $h_b$ is the defined channel measurement vector, and $h_b^H$ is a complex conjugate transpose of $h_b$.

3. The computer-readable medium of claim 1, wherein the geographic location is selected based on a cell associated with a maximum value of the calculated likelihood value.

4. The computer-readable medium of claim 1, wherein before (d), a subset of the plurality of cells is determined that bound a possible location of the radiator, wherein (d) through (f) are performed with the subset of the plurality of cells.

5. The computer-readable medium of claim 1, wherein the test channel measurement vector is normalized.

6. The computer-readable medium of claim 1, wherein the plurality of test channel measurement vectors are defined for the test radiator positioned at different locations within the first cell, wherein the cell covariance matrix is calculated based on the plurality of test channel measurement vectors defined for the test radiator positioned in the first cell.

7. The computer-readable medium of claim 6, wherein the different locations within the first cell are uniformly distributed within the first cell.

8. The computer-readable medium of claim 6, wherein the cell covariance matrix is calculated using $$\Sigma_{b,k} = \frac{1}{N}\sum_{i=1}^{N} h_b(x_{r,i}, y_{r,i}) h_b^H(x_{r,i}, y_{r,i}),$$

where N is a number of the different locations within the first cell, $h_b(x_{r,i}, y_{r,i})$ is a respective test channel measurement vector at a location $x_{r,i}, y_{r,i}$ of the different locations within the first cell, and $h_b^H(x_{r,i}, y_{r,i})$ is a complex conjugate transpose of $h_b(x_{r,i}, y_{r,i})$.

9. The computer-readable medium of claim 8, wherein the cell covariance matrix is a sparse cell covariance matrix further determined using a sparsity mask $\beth = \{i: \Sigma_{b,k}(i,i) \geq \gamma \max_i \Sigma_{b,k}(i,i)\}$, where i is an index to $\Sigma_{b,k}$, and $\gamma$ is a predefined threshold value between zero and one.

10. The computer-readable medium of claim 9, wherein the predefined threshold value is defined such that $\Sigma_{i \in \beth} \Sigma_{b,k}(i,i) \geq \eta \sigma^2$, where $\eta$ is a predefined power fraction value between zero and one, and $\sigma^2 = \text{tr}(\Sigma_{b,k})$ is a total channel power.

11. The computer-readable medium of claim 9, wherein the cell covariance matrix is defined as $[\Sigma_{b,k}(i,j)]_{i,j \in \beth}$, where i and j are row and column indices to $\Sigma_{b,k}$, respectively, and $\gamma$ is a predefined threshold value.

12. The computer-readable medium of claim 1, wherein the defined channel measurement vector is normalized before using the defined channel measurement vector to calculate the likelihood value.

13. The computer-readable medium of claim 12, wherein the defined channel measurement vector is normalized based on an average channel power in each cell $E[\|h_b\|^2]$, where $h_b$ is the defined channel measurement vector.

14. The computer-readable medium of claim 12, wherein the defined channel measurement vector is normalized so that $\|h_b\|^2 = 1$, where $h_b$ is the defined channel measurement vector.

15. The computer-readable medium of claim 1, wherein the channel measurement vector is defined in a beamspace multiple input, multiple output channel representation coordinate system.

16. The computer-readable medium of claim 15, wherein a beamspace channel matrix is a unitarily equivalent representation of an antenna domain channel matrix.

17. The computer-readable medium of claim 16, wherein the beamspace channel matrix is a linear representation of the antenna domain channel matrix with respect to fixed virtual angles of arrival at the plurality of antennas and fixed virtual angles of departure from the radiator, wherein the fixed virtual angles of arrival and the fixed virtual angles of departure are determined by a geometry of the plurality of antennas and of the radiator.

18. The computer-readable medium of claim 16, wherein the beamspace channel matrix is a linear representation of the antenna domain channel matrix with respect to fixed virtual path delays at the plurality of antennas from the radiator, wherein the fixed virtual path delays are determined by a signaling bandwidth and by a geometry between the plurality of antennas and the radiator.

19. A computing device comprising:

a processor; and a non-transitory computer-readable medium operably coupled to the processor, the computer-readable medium having computer-readable instructions stored thereon that, when executed by the processor, cause the computing device to (a) define a test channel measurement vector, wherein the test channel measurement vector includes a test signal value measured at each of a plurality of antennas in response to a test signal transmitted from a test radiator positioned in a first cell of a plurality of cells defined for a region;

(b) calculate a cell covariance matrix for the first cell from the defined test channel measurement vector;

(c) store the calculated cell covariance matrix for each cell of the plurality of cells:

repeat (a) through (c) with each remaining cell of the plurality of cells as the first cell;

define a channel measurement vector, wherein the channel measurement vector includes a signal value measured at each of the plurality of antennas in response to a signal transmitted from a radiator;

(d) select the stored cell covariance matrix of the first cell;

(e) calculate a likelihood value that the radiator is located in the first cell using the selected cell covariance matrix and the defined channel measurement vector;
(f) repeat (d) and (e) with each remaining cell of the plurality of cells as the first cell; and
determine a geographic location for the radiator based on the calculated likelihood value for each cell of the plurality of cells.

20. A method of radiator localization, the method comprising:
(a) defining, by a computing device, a test channel measurement vector, wherein the test channel measurement vector includes a test signal value measured at each of a plurality of antennas in response to a test signal transmitted from a test radiator positioned in a first cell of a plurality of cells defined for a region;
(b) calculating, by the computing device, a cell covariance matrix for the first cell from the defined test channel measurement vector;
(c) storing, by the computing device, the calculated cell covariance matrix for each cell of the plurality of cells;
repeating, by the computing device, (a) through (c) with each remaining cell of the plurality of cells as the first cell;
defining a channel measurement vector by the computing device, wherein the channel measurement vector includes a signal value measured at each of the plurality of antennas in response to a signal transmitted from a radiator;
(d) selecting, by the computing device, the stored cell covariance matrix of the first cell;
(e) calculating, by the computing device, a likelihood value that the radiator is located in the first cell using the selected cell covariance matrix and the defined channel measurement vector;
(f) repeating, by the computing device, (d) and (e) for each remaining cell of the plurality of cells as the first cell; and
determining, by the computing device, a geographic location for the radiator based on the calculated likelihood value for each cell of the plurality of cells.

* * * * *

UNITED STATES PATENT AND TRADEMARK OFFICE
CERTIFICATE OF CORRECTION

PATENT NO. : 9,763,216 B2
APPLICATION NO. : 14/455095
DATED : September 12, 2017
INVENTOR(S) : Akbar M. Sayeed et al.

It is certified that error appears in the above-identified patent and that said Letters Patent is hereby corrected as shown below:

In the Specification

Column 4, Lines 48 and 50:
Delete "$\theta_r = \frac{d_r}{\lambda} \sin(\alpha_{r,l})$"
and replace with -- $\theta_r = \frac{d_r}{\lambda} \sin(\alpha_{r,l})$ --

Column 4, Lines 54 and 56:
Delete "$\theta_t = \frac{d_t}{\lambda} \sin(\alpha_{t,l})$"
and replace with -- $\theta_t = \frac{d_t}{\lambda} \sin(\alpha_{t,l})$ --

Column 7, Line 42:
Delete "$U_r = \frac{1}{N_r}[a_r(i\Delta\theta_r)]_{i\in\lambda(N_r)}$" and replace with -- $U_r = \frac{1}{N_r}[a_r(i\Delta\theta_r)]_{i\in\mathfrak{I}(N_r)}$ --

Column 7, Line 44:
Delete "$U_t = \frac{1}{N_t}[a_t(k\Delta\theta_t)]_{k\in\lambda(N_t)}$" and replace with -- $U_t = \frac{1}{N_t}[a_t(k\Delta\theta_t)]_{k\in\mathfrak{I}(N_t)}$ --

Column 13, Lines 13-14:
Delete "$\sum_{i\in\mathcal{M}}\Sigma_{b,k}(i,i) \geq \eta\sigma^2$" and replace with -- $\sum_{i\in\mathcal{M}}\Sigma_{b,k}(i,i) \geq \eta\sigma^2$ --

Signed and Sealed this
Twenty-fourth Day of April, 2018

Andrei Iancu
*Director of the United States Patent and Trademark Office*

CERTIFICATE OF CORRECTION (continued)
U.S. Pat. No. 9,763,216 B2

Column 14, Line 4:
Delete "$N_r N_t \times N_t$" and replace with --$N_r \times N_t$--

In the Claims

Column 17, Lines 25-26, Claim 2:
Delete "$-(\log(|\Sigma_{b,k}|) + h_b{}^H \Sigma_{b,k}{}^{-1} h_b)$,"
and replace with --$-(\log(|\Sigma_{b,k}|) + h_b^H \Sigma_{b,k}^{-1} h_b)$--

Column 17, Lines 63-64, Claim 9:
Delete "$\beth = \{i: \Sigma_{b,k}(i,i) \geq \gamma \max_i \Sigma_{b,k}(i,i)\}$,"
and replace with --$\mathcal{M} = \{i: \Sigma_{b,k}(i,i) \geq \gamma \max_i \Sigma_{b,k}(i,i)\}$--

Column 17, Line 67-Column 18, Line 1, Claim 10:
Delete "$\Sigma_{i \in \beth} \Sigma_{b,k}(i,i) \geq \eta \sigma^2$," and replace with --$\Sigma_{i \in \mathcal{M}} \Sigma_{b,k}(i,i) \geq \eta \sigma^2$--

Column 18, Line 5, Claim 11:
Delete "$[\Sigma_{b,k}(i,j)]_{i,j \in \beth}$," and replace with --$[\Sigma_{b,k}(i,j)]_{i,j \in \mathcal{M}}$--